(12) United States Patent
Sako

(10) Patent No.: US 12,212,862 B2
(45) Date of Patent: Jan. 28, 2025

(54) DISPLAY SYSTEM

(71) Applicant: Japan Display Inc., Tokyo (JP)

(72) Inventor: Kazuhiko Sako, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/425,111

(22) Filed: Jan. 29, 2024

(65) Prior Publication Data

US 2024/0259704 A1 Aug. 1, 2024

(30) Foreign Application Priority Data

Jan. 31, 2023 (JP) .................. 2023-012880

(51) Int. Cl.
*H04N 25/531* (2023.01)
*G09G 3/36* (2006.01)
*H04N 7/18* (2006.01)

(52) U.S. Cl.
CPC ......... *H04N 25/531* (2023.01); *G09G 3/3648* (2013.01); *H04N 7/183* (2013.01); *G09G 2320/0666* (2013.01)

(58) Field of Classification Search
CPC ......... G09G 2320/0666; G09G 3/3648; H04N 7/183; H04N 25/531
See application file for complete search history.

(56) References Cited

U.S. PATENT DOCUMENTS

2005/0128332 A1 6/2005 Tsuboi
2014/0347436 A1 11/2014 DeMerchant et al.
2023/0070449 A1* 3/2023 Vonolfen ............. H04N 5/2625

* cited by examiner

*Primary Examiner* — Abbas I Abdulselam
(74) *Attorney, Agent, or Firm* — Michael Best & Friedrich LLP

(57) ABSTRACT

According to one embodiment, a display system includes a display device, a rolling shutter camera, a shutter and a control device. The display device includes a display area and a light emitting element. The rolling shutter camera is arranged behind the display device. The shutter is arranged between the display device and the camera. The control device controls the operation of the shutter to block light traveling toward the camera during a first sub-frame period during which the light emitting element is turned on and an image is displayed on the display area, and to transmit light traveling toward the camera during a second sub-frame period during which the light emitting elements is not turned on and the display area is made transparent.

12 Claims, 15 Drawing Sheets

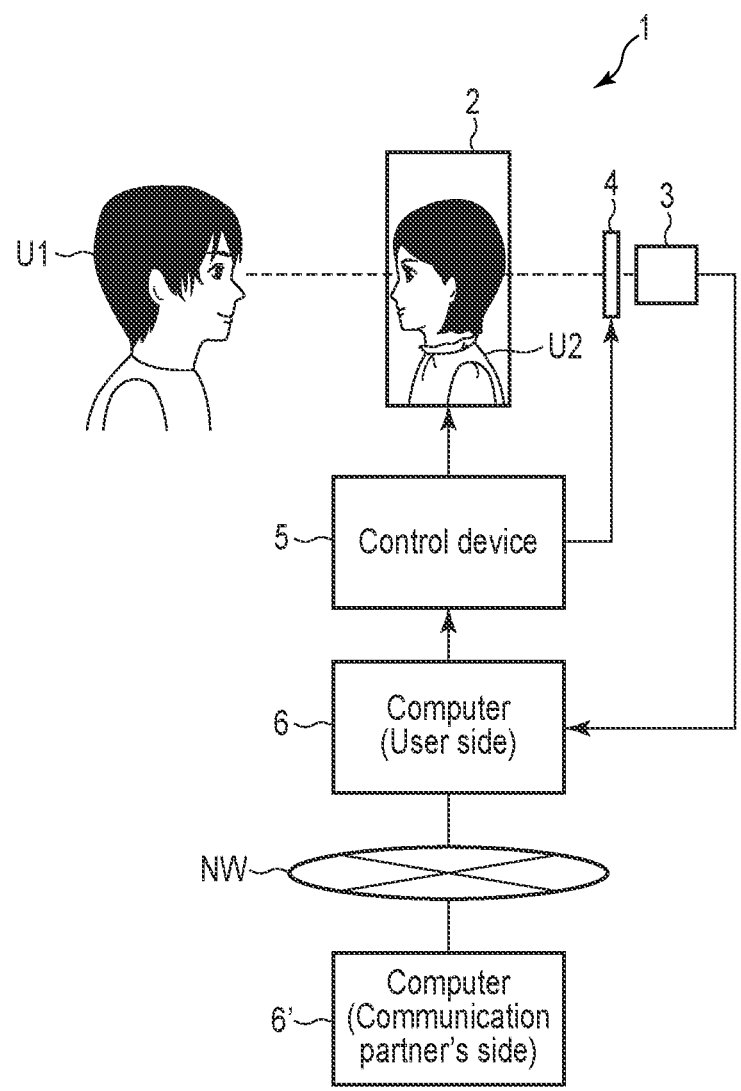
F I G. 1

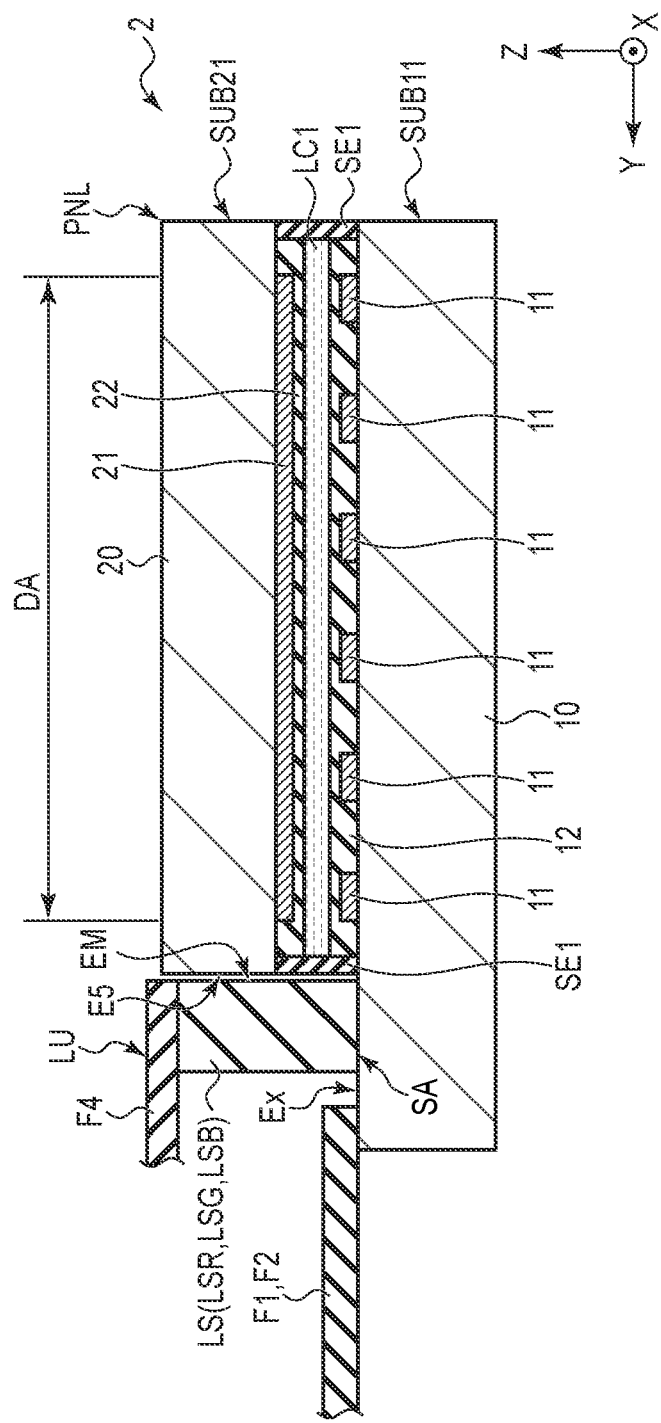
F I G. 3

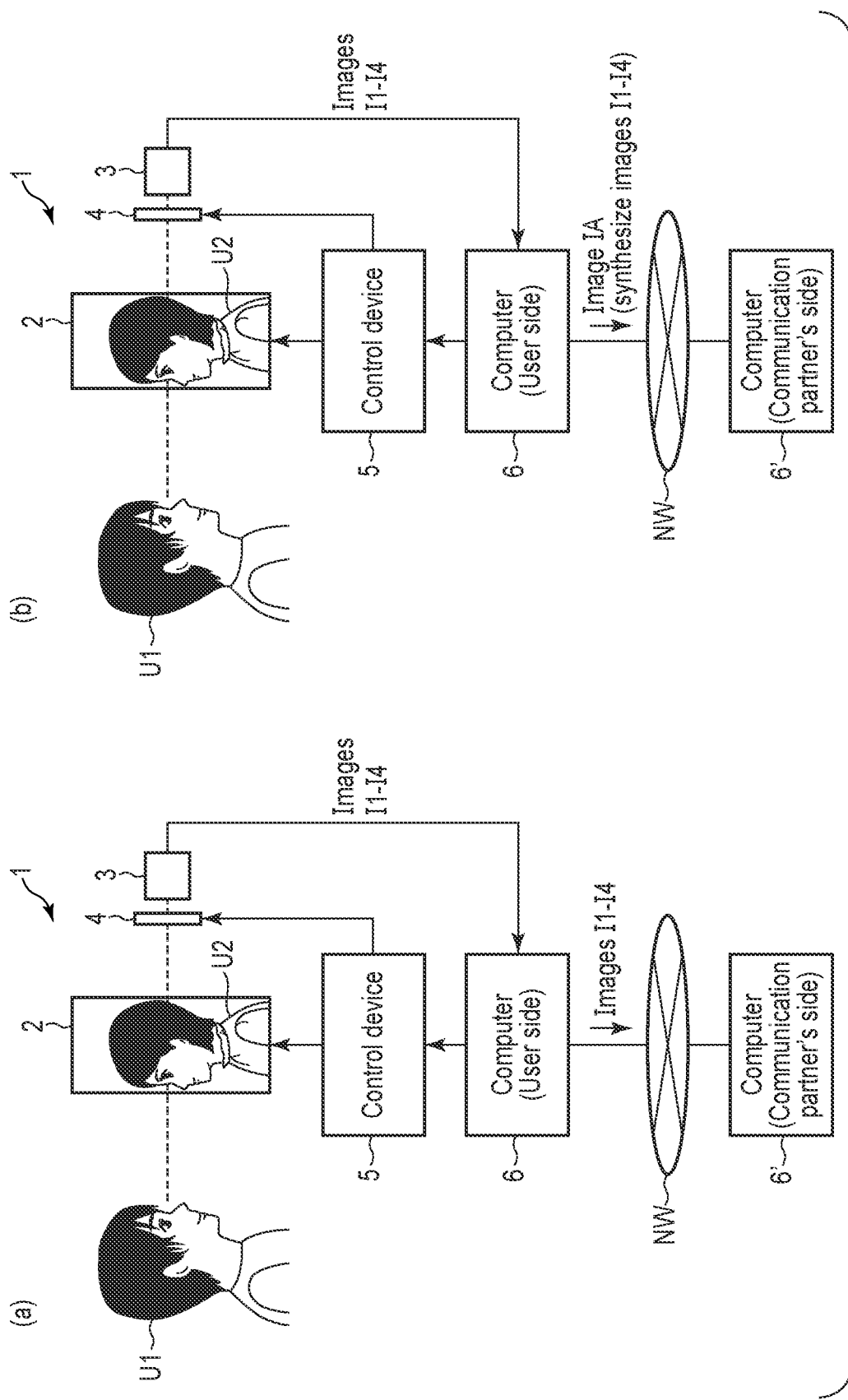
F I G. 9

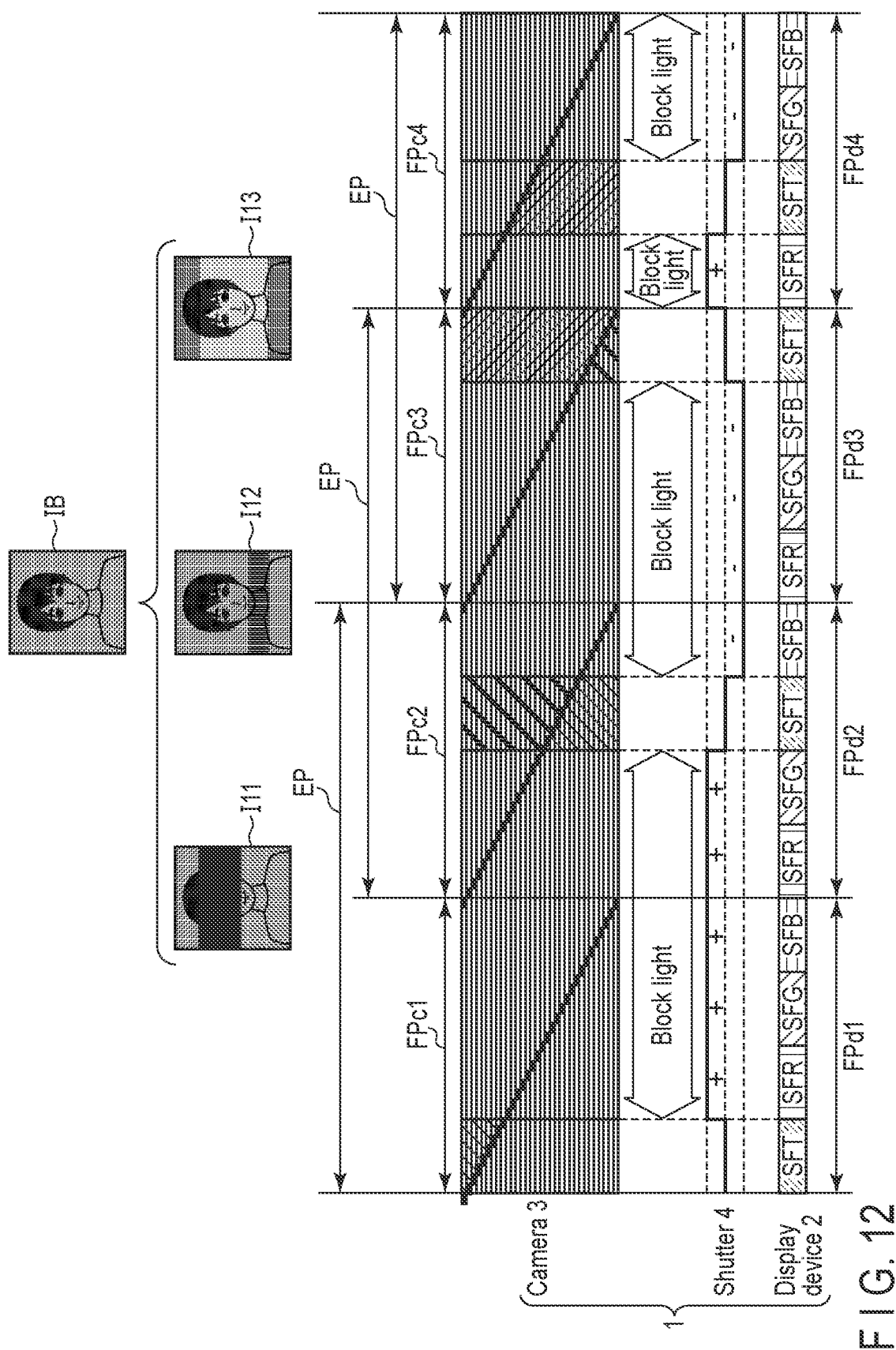
F I G. 12

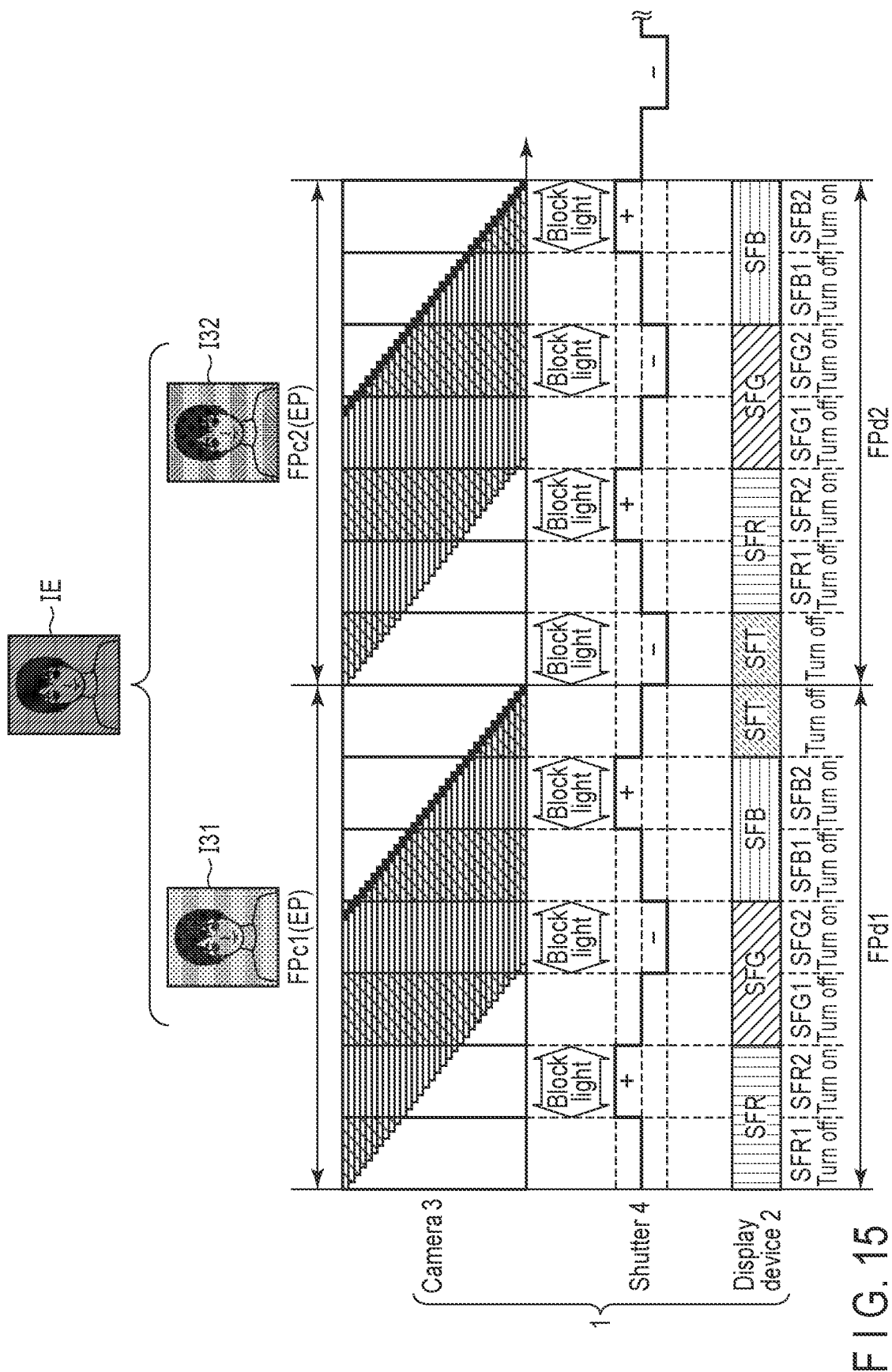

DISPLAY SYSTEM

CROSS-REFERENCE TO RELATED APPLICATIONS

This application is based upon and claims the benefit of priority from Japanese Patent Application No. 2023-012880, filed Jan. 31, 2023, the entire contents of which are incorporated herein by reference.

FIELD

Embodiments described herein relate generally to a display system.

BACKGROUND

In recent years, web conferencing and video calls have become prevalent. In such web conference and video calls, a line of sight of a person watching an image (video) displayed on a screen may not correspond to that of a person displayed on the screen.

For this reason, systems capable of capturing a subject through a screen while arranging a camera behind a transparent display have been developed as systems capable of making a line of sight of a person watching an image on the screen correspond to that of a person displayed in the image. In such a system, the subject is captured when no image is displayed on the transparent display (i.e., when the transparent display is transparent).

By the way, inexpensive rolling shutter cameras (e.g., web cameras) are often used as cameras for capturing the subject, in the web conference and video calls. However, a problem arises that interference fringes tend to occur in images captured by rolling shutter cameras.

BRIEF DESCRIPTION OF THE DRAWINGS

FIG. 1 is a view showing a schematic configuration example of a display system according to one embodiment.

FIG. 3 is a schematic cross-sectional view showing the display device according to the embodiment.

FIG. 9 is a view illustrating an example of a method of displaying an image captured by the operation operation example of the display system according to the first modified example of the embodiment.

FIG. 15 is a view illustrating an operation example of the display system according to a third modified example of the embodiment.

DETAILED DESCRIPTION

Figure 2:
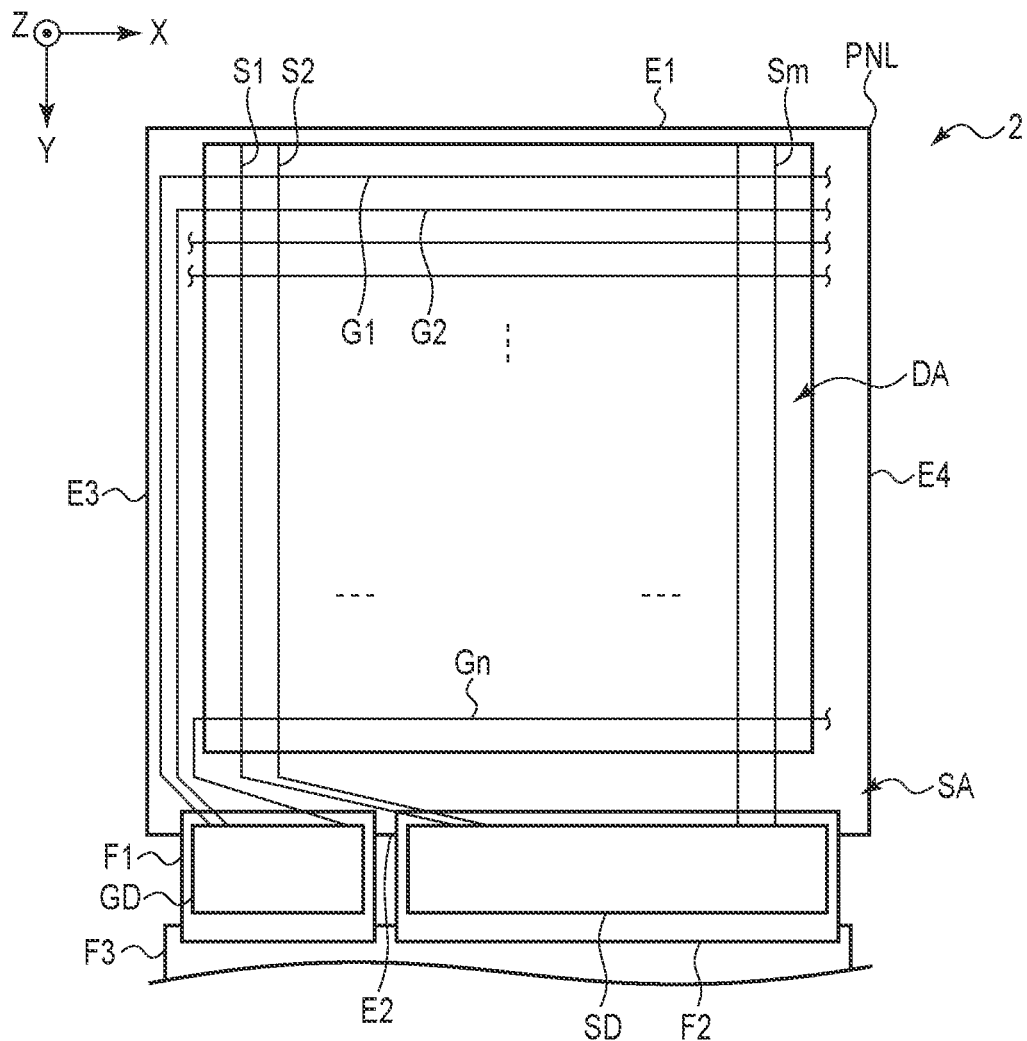
FIG. 2 is a schematic plan view showing the display device according to the embodiment.

In general, according to one embodiment, a display system comprises a display device, a rolling shutter camera, a shutter and a control device. The display device includes a display area where an image is displayed and external light is transmitted, and a light emitting element. The rolling shutter camera is arranged behind the display device. The shutter is arranged between the display device and the camera. The control device controls an operation of the display device and an operation of the shutter. The display device operates according to a one-frame period including a first sub-frame period during which the light emitting element is turned on and an image is displayed on the display area, and a second sub-frame period during which the light emitting elements is not turned on and the display area is made transparent. The control device periodically controls the operation of the display device with the plurality of one-frame periods regarded as one cycle, and controls the operation of the display device such that the plurality of one-frame periods included in the cycle start the second sub-frame period at different timing from start of the one-frame periods. The control device controls the operation of the shutter to block light traveling toward the camera during the first sub-frame period and to transmit light traveling toward the camera during the second sub-frame period.

According to another embodiment, a display system comprises a display device, a rolling shutter camera, a shutter and a control device. The display device includes a display area where an image is displayed and external light is transmitted, and a light emitting element. The rolling shutter camera is arranged behind the display device. The shutter is arranged between the display device and the camera. The control device controls an operation of the display device and an operation of the shutter. The display device operates according to a one-frame period including a first sub-frame period during which the light emitting element is turned on and an image is displayed on the display area, and a second sub-frame period during which the light emitting elements is not turned on and the display area is made transparent. The first sub-frame period includes a red sub-frame period in which a red light emitting element is turned on and a red image is displayed on the display area, a green sub-frame period in which a green light-emitting element is turned on and a green image is displayed on the display area, and a blue sub-frame period in which a blue light-emitting element is turned on and a blue image is displayed in the display area. The display device operates according to the one-frame period including the red sub-frame period, the green sub-frame period, the blue sub-frame period, and the second sub-frame period, the red sub-frame period, the green sub-frame period, and the blue sub-frame period are set to have lengths equal to one another, and the second sub-frame period is set to have half a length of the red sub-frame period, the green sub-frame period, and the blue sub-frame period. The control device periodically controls the operation of the display device with two frame periods set as one cycle, and controls the operation of the display device to start each sub-frame period in the order of the first sub-frame period and the second sub-frame period in the first frame period included in the cycle, and controls the operation of the display device to start each sub-frame period in the order of the second sub-frame period and the first sub-frame period in a subsequent frame period included in the cycle. The control device controls the operation of the shutter so as to transmit light traveling toward the camera in half of the red sub-frame period, the green sub-frame period, and the blue sub-frame period included in the first sub-frame period, and in the second sub-frame period included in the first frame period, and to block light traveling toward the camera in half of the red sub-frame period, the green sub-frame period, and the blue sub-frame period included in the first sub-frame period, and in the second sub-frame period included in the subsequent frame period.

Embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

FIG. 1 is a view showing a schematic configuration example of a display system 1 according to one embodiment. The display system 1 is a system used to perform web conference and video calls. The display system 1 comprises a display device 2, a camera 3, a shutter 4, a control device 5, and a computer 6 as shown in FIG. 1.

The display device 2 is a so-called transparent display with a display area that shows images and transmits external light. An image (face) of a communication partner U2 is displayed on the display device 2.

The camera 3 is arranged behind the display device 2. As described above, since the display device 2 is a transparent display, the camera 3 can capture a user U1 (subject) through the display device 2. As will be described in detail later, the camera 3 of the present embodiment is a rolling shutter camera (for example, a web camera).

The shutter 4 is an external shutter arranged between the display device 2 and the camera 3. The shutter 4 controls an exposure time of an image sensor (not shown) that constitutes the camera 3 by performing opening and closing operations. The shutter 4 transmits light traveling toward the camera 3 in an opened state, and blocks light traveling toward the camera 3 in a closed state. It is shown in FIG. 1 for convenience that the camera 3 and the shutter 4 are separated from each other, but the camera 3 and the shutter 4 may be in close contact with each other.

The control device 5 is connected to the display device 2 and the shutter 4. The control device 5 performs display control for displaying images on the display device 2, lighting control for switching turning on/off of a light emitting element to be described below, opening/closing control for switching the opened state/closed state of the shutter 4, and the like.

The computer 6 is communicably connected to a computer 6' on the communication partner's side via a network NW. The user U1 performs web conference or video calls with the communication partner U2 using a predetermined application or a predetermined web browser installed in advance in the computer 6. The computer 6 transmits the images (video data) captured by the camera 3 to the computer 6' on the communication partner's side. In addition, the computer 6 receives the images (video data) transmitted from the computer 6' on the communication partner's side and outputs the images to the control device 5.

According to the display system 1 shown in FIG. 1, since the user U1 can see the camera 3 arranged behind the display device 2 while seeing the communication partner's face displayed on the display device 2, the camera 3 can capture the user U1 looking at the camera. According to this, since the user U1 looking at the camera is displayed on a display device (not shown) on the communication partner's side, the communication partner U2 can talk with the user U1 displayed on the display device by making the line of sight match that of the user U1. By introducing the display system 1 shown in FIG. 1 to both the user side and the communication partner's side, both sides can talk while making their lines of sight match, and can realize a natural conversation environment.

FIG. 2 is a plan view showing a schematic configuration example of the display device 2 shown in FIG. 1.

As shown in FIG. 2, a first direction X and a second direction Y are directions intersecting each other, and a third direction Z is a direction intersecting the first direction X and the second direction Y. The first direction X corresponds to the row direction while the second direction Y corresponds to the columnar direction. For example, the first direction X, the second direction Y, and the third direction Z are orthogonal to one another but may intersect at an angle other than ninety degrees. In the present specification, a direction toward a distal part of an arrow indicating the third direction Z is referred to as upward (or, simply, above) or forward, and a direction opposite to the distal part of the arrow is referred to as downward (or, simply, below) or backward.

The display device 2 comprises a display panel PNL, wiring boards F1, F2, and F3, and the like. The display panel PNL has a display area DA where images are displayed and a frame-shaped surrounding area SA surrounding the display area DA. The display area DA includes n gate lines G (G1 to Gn) and m source lines S (S1 to Sm). Incidentally, each of n and m is a positive integer, and n may be equal to or different from m. The plurality of gate lines G extend in the first direction X and are arranged to be spaced apart in the second direction Y. In other words, the plurality of gate lines G extend in the row direction. The plurality of source lines S extend in the second direction Y and are arranged to be spaced apart in the first direction X. In other words, the plurality of source lines S extend in the columnar direction. The display panel PNL includes end portions E1 and E2 along the first direction X, and end portions E3 and E4 along the second direction Y.

The wiring board F1 is provided with a gate driver GD. The plurality of gate lines G are connected to the gate driver GD. The wiring board F2 is provided with a source driver SD. The plurality of source lines S are connected to the source driver SD. Each of the wiring boards F1 and F2 is connected to the display panel PNL and the wiring board F3. The wiring board F3 is electrically connected to the wiring boards F1 and F2, the control device 5 shown in FIG. 1, and the like. The gate driver GD and the source driver SD operate according to control signals from the control device 5 shown in FIG. 1. Incidentally, the wiring boards F1 and F2 may be provided as single wiring boards. Alternatively, the wiring boards F1, F2, and F3 may be provided as single wiring boards.

FIG. 3 is a cross-sectional view showing the display device 2 shown in FIG. 2. Main portions alone in the cross-section of the display device 2 in a Y-Z plane defined by the second direction Y and the third direction Z will be described here.

As shown in FIG. 3, the display panel PNL includes a first substrate SUB11, a second substrate SUB21, a liquid crystal layer LC1 serving as a display function layer, and the like. The first substrate SUB11 includes a transparent substrate 10, a plurality of pixel electrodes 11, an alignment film 12, and the like. The second substrate SUB21 includes a transparent substrate 20, a common electrode 21, an alignment film 22, and the like. The plurality of pixel electrodes 11 and the common electrode 21 are formed of, for example, a transparent conductive material such as ITO or IZO, and are located in the display area DA. Each of the alignment film 12 and the alignment film 22 is in contact with the liquid crystal layer LC1.

The liquid crystal layer LC1 is located in at least the display area DA. The liquid crystal layer LC1 contains a polymer dispersed liquid crystal, and is held between the first substrate SUB11 and the second substrate SUB21. In the present embodiment, it is assumed that the liquid crystal layer LC1 contains a normal-type polymer dispersion liquid crystal. For this reason, the liquid crystal layer LC1 becomes in a scattering state when no electric field acts on the liquid crystal layer LC1, and becomes in a transparent state when an electric field acts on the liquid crystal layer LC1. The scattering state is a state in which the light made incident on the liquid crystal layer LC1 is scattered in the liquid crystal layer LC1. The transparent state is a state in which the light made incident on the liquid crystal layer LC is not substantially scattered in the liquid crystal layer LC and is transmitted. The display panel PNL can display an image in the display area DA when the liquid crystal layer LC1 is in the scattered state, and can transmit external light when the liquid crystal layer LC1 is in the transparent state.

The first substrate SUB11 and the second substrate SUB21 are bonded to each other by a sealing material SE1. The first substrate SUB11 includes an extending portion Ex that extends in the second direction Y beyond an end portion E5 of the transparent substrate 20.

The wiring boards F1 and F2 are connected to the extending portion Ex of the first substrate SUB11.

A light source unit LU is located in the surrounding area SA outside the display area DA. The light source unit LU comprises a light emitting element LS, a wiring board F4, and the like. The light emitting element LS is connected to the wiring board F4 and located on the extending portion Ex. The light emitting element LS includes a light emitting portion (light emitting surface) EM opposed to the end portion E5. Illumination light emitted from the light emitting portion EM is made incident on the transparent substrate 20 from the end portion E5, propagates through the transparent substrate 20, and is made incident on the liquid crystal layer LC1. The wiring board F4 is electrically connected to the control device 5, and the like shown in FIG. 1. The light emitting element LS operates according to the control signal from the control device 5 shown in FIG. 1, and is controlled to turn on/off.

Incidentally, the light source unit LU according to the present embodiment comprises light emitting elements LS of plural colors. More specifically, the light source unit LU comprises light emitting elements LSR that emit red light, light emitting elements LSG that emit green light, and light emitting elements LSB that emit blue light. As described below in detail, the display device 2 according to the present embodiment is driven by a field sequential system in which one frame period includes a plurality of sub-frame periods. Therefore, in each sub-frame, at least one of the light emitting elements LSR, LSG, and LSB described above is turned on and its color is switched in each sub-frame.

Figure 4:
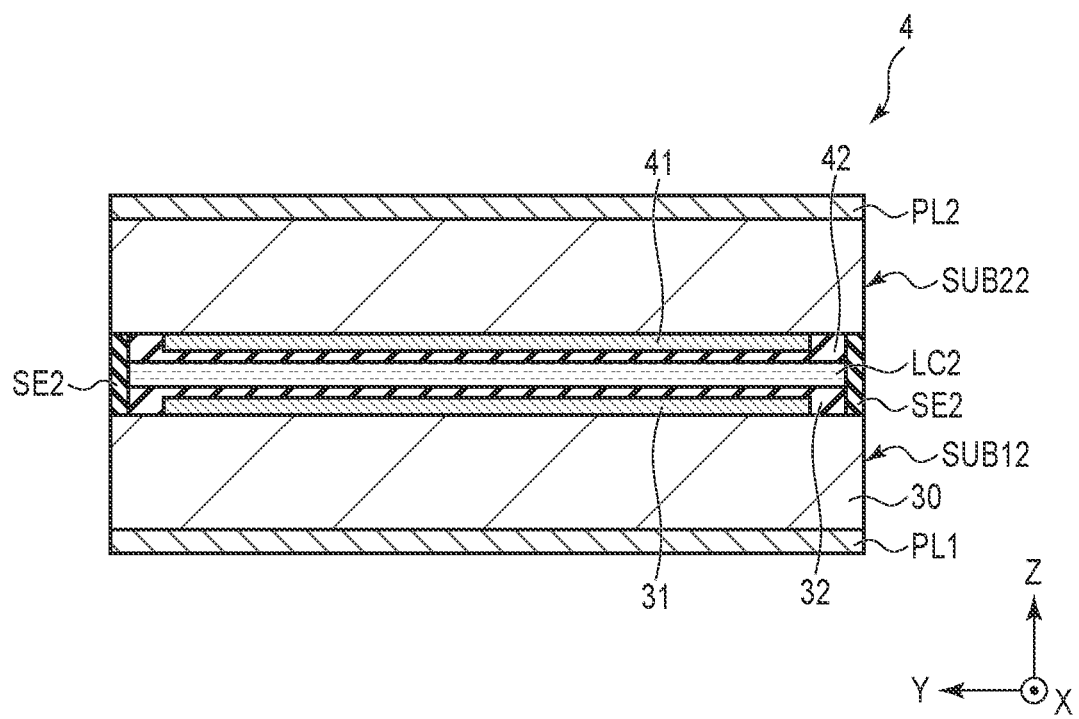
FIG. 4 is a schematic cross-sectional view showing a shutter according to the embodiment.

FIG. 4 is a cross-sectional view showing a schematic configuration example of the shutter 4 shown in FIG. 1.

The shutter 4 in the present embodiment is a so-called liquid crystal shutter, and comprises a first substrate SUB12, a second substrate SUB22, a liquid crystal layer LC2 that functions as a shutter, a first polarizer PL1, a second polarizer PL2, and the like, as shown in FIG. 4. The first substrate SUB12 and the second substrate SUB22 are bonded to each other by a sealing material SE2.

The first substrate SUB12 comprises a transparent substrate 30, a first electrode 31, an alignment film 32, and the like. The second substrate SUB22 comprises a transparent substrate 40, a second electrode 41, an alignment film 42, and the like. The first electrode 31 and the second electrode 41 are formed of, for example, a transparent conductive material such as ITO or IZO and are arranged at positions which overlap with the liquid crystal layer LC2. A voltage of the same potential as the reference potential is applied to the second electrode 41, and a voltage equal to or higher or lower than the reference potential is applied to the first electrode 31. Each of the alignment film 32 and the alignment film 42 is in contact with the liquid crystal layer LC2.

Twisted Nematic (TN) liquid crystal is used for the liquid crystal layer LC2, and the initial alignment direction of the liquid crystal molecules on the first substrate SUB12 side and the second substrate SUB22 side intersect at ninety degrees.

The shutter 4 operates in a normally white mode in which the alignment of the liquid crystal molecules changes to become a closed state (black display) when an electric field acts on the liquid crystal layer LC2 or the alignment of the liquid crystal molecules does not change and becomes an opened state (white display) when no electric field acts on the liquid crystal layer LC2. However, the shutter 4 may operate in a normally black mode in which the alignment of the liquid crystal molecules changes to become an opened state (white display) when an electric field acts on the liquid crystal layer LC2 or the alignment of the liquid crystal molecules does not change and becomes a closed state (black display) when no electric field acts on the liquid crystal layer LC2.

The first polarizer PL1 is arranged on a lower surface of the first substrate SUB12. The second polarizer PL2 is arranged on an upper surface of the second substrate SUB22. A polarization axis of the first polarizer PL1 and a polarization axis of the second polarizer PL2 have, for example, a crossed-Nicol relationship, i.e., intersect at ninety degrees. According to this, the shutter 4 can transmit light made incident from the first substrate SUB12 side, in the open state, and block light made incident from the first substrate SUB12 side, in the closed state. When the light transmitted through the display device 2 to the shutter 4 is polarized light having a polarization axis in a certain direction, the shutter 4 may be configured to include only the second polarizer PL2.

The shutter 4 having the configuration shown in FIG. 4 functions as a liquid crystal shutter and controls the exposure time of the image sensor constituting the camera 3. Incidentally, in the present embodiment, it is assumed that the shutter 4 is a liquid crystal shutter, but the shutter 4 is not limited to this and may be a physical shutter. In consideration of the operation noise at the time of opening or closing the shutter, and the like, however, the shutter 4 is desirably a liquid crystal shutter.

Figure 5:
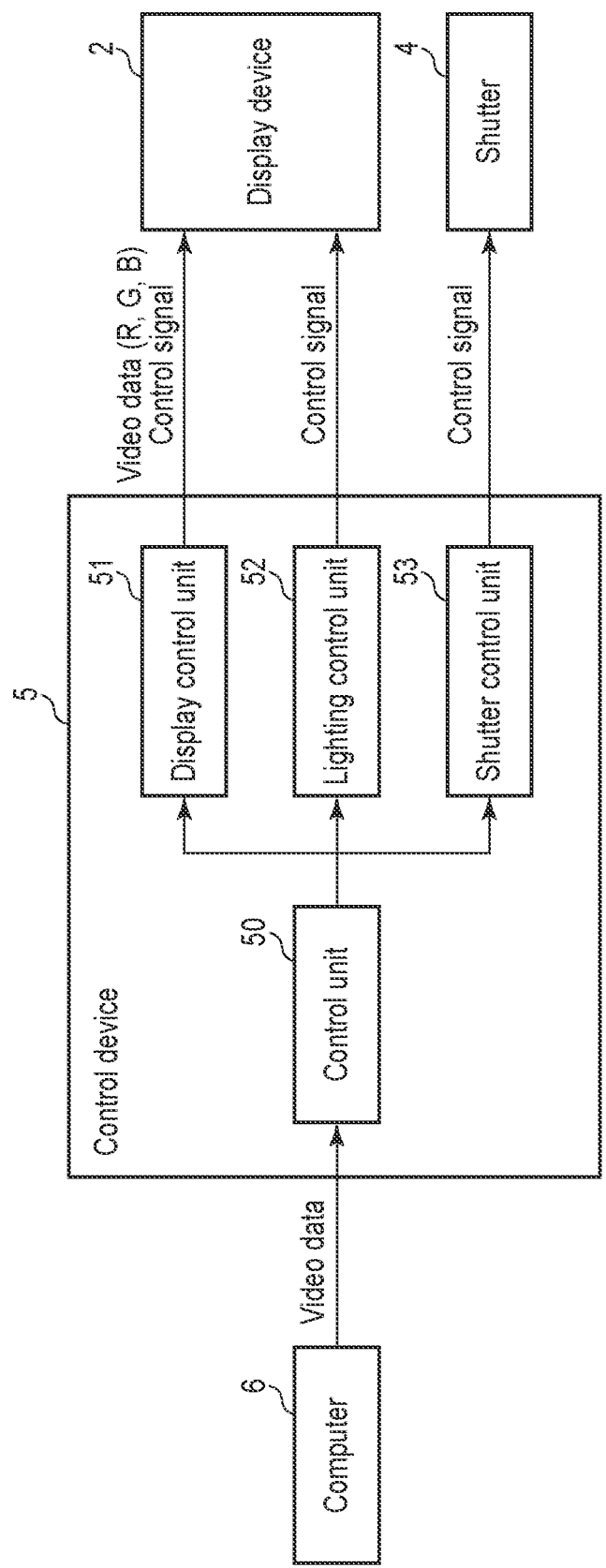
FIG. 5 is a block diagram showing a functional configuration example of a control device according to the embodiment.

FIG. 5 is a block diagram showing a functional configuration example of the control device 5 shown in FIG. 1.

As shown in FIG. 5, the control device 5 comprises a control unit 50, a display control unit 51, a lighting control unit 52, a shutter control unit 53, and the like.

The control unit 50 controls the operation of each of the units 51 to 53. When the control unit 50 receives input of video data output from the computer 6 (i.e., video data showing the image of the communication partner U2 shown in FIG. 1), the control unit 50 outputs the video data to the display control unit 51.

When receiving input of the video data output from the control unit 50, the display control unit 51 outputs video data of red (R), video data of green (G), and video data of blue (B) included in the video data, as well as control signals for controlling the timing of displaying images based on these video data, to the display device 2. The lighting control unit 52 outputs control signals to control (switch) turning on/off the light emitting element LS provided in the display device 2, to the display device 2. The shutter control unit 53 outputs control signals to control (switch) the open/closed state of the shutter 4 and control signals to control the polarity of the shutter 4 (more specifically, the polarity of the shutter 4 in the closed state), to the shutter 4.

Figure 6:
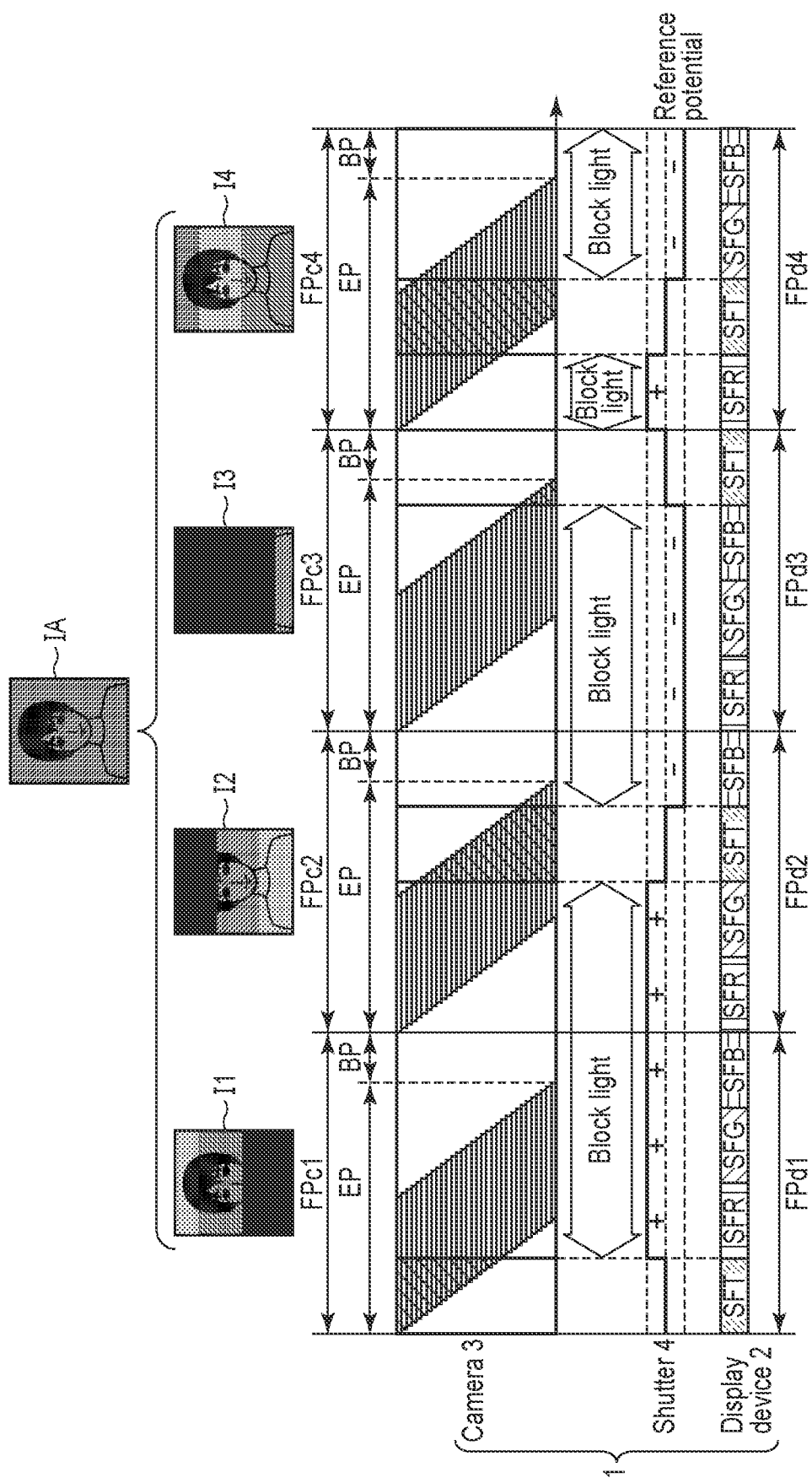
FIG. 6 is a view illustrating an operation example of the display system according to the embodiment.

FIG. 6 is a view illustrating an operation example of the display system 1 according to the embodiment. It is assumed in FIG. 6 that, for example, a refresh rate of the display device 2 and a frame rate of the camera 3 correspond to each other. In other words, it is assumed that one frame period FPd of the display device 2 and one frame period FPc of the camera 3 correspond to each other (are synchronized with each other). Incidentally, the one frame period FPc of the camera 3 may be restated as an exposure cycle of the camera 3. In addition, it is assumed in FIG. 6 that the display system 1 of the present embodiment operates cyclically with four frame periods of the display device 2 (or four frame periods of the camera 3) as one cycle.

As shown in FIG. 6, the camera 3 operates similarly in a first frame period FPc1, a second frame period FPc2, a third frame period FPc3, and a fourth frame period FPc4. For this reason, only the operation of the camera 3 in the first frame period FPc1 will be described below, and description of the operation of the camera 3 in the other frame periods FPc2 to FPc4 will be omitted.

The first frame period FPc1 of the camera 3 includes an exposure period EP and a blanking period BP. When the exposure period EP starts with the start of the first frame period FPc1, the camera 3 starts sequentially exposing from the first pixel row to the last pixel row in the image sensor. The exposure period EP is the period from the start of the exposure of the first pixel row of the image sensor to the end of the exposure of the last pixel row. As described above, since the camera 3 of the present embodiment is a rolling shutter camera and sequentially performs exposing for each pixel row, the exposure start time and the exposure end time for each pixel row are different from each other. The blanking period BP is the period from the end of the exposure of the last pixel row of the image sensor to the start of the next one frame period (in this case, the second frame period FPc2). In the present embodiment, a read period (or reset period) for reading the data of each pixel after performing the exposure for a predetermined period of time for each pixel row is set in the rolling shutter camera. The read period is significantly shorter than the exposure period for each pixel row. In the present embodiment, the above-described exposure period of each pixel row is considered to be the period including the read period. Alternatively, if there is some free time between the previous and following exposure periods, as shown in FIG. 6, the only exposure period may be simply considered as the exposure period.

In contrast, the display device 2 performs the display operation by setting four frame periods, i.e., the first frame period FPd1, the second frame period FPd2, the third frame period FPd3, and the fourth frame period FPd4 as one cycle. Each of the frame periods FPd1 to FPd4 includes a red sub-frame period SFR, a green sub-frame period SFG, a blue sub-frame period SFB, and a transparent sub-frame period SFT. FIG. 6 shows a case in which the lengths of the respective sub-frame periods SFR, SFG, SFB, and SFT are equal to each other.

The red sub-frame period SFR is a period during which red video data is written to each of the pixels PX arranged in the display area DA and the red light emitting element LSR is turned on, thereby displaying a red image on the display area DA. The green sub-frame period SFG is a period during which green video data is written to each of the pixels PX arranged in the display area DA and the green light emitting element LSG is turned on, thereby displaying a green image on the display area DA. The blue sub-frame period SFB is a period during which blue video data is written to each of the pixels PX arranged in the display area DA and the blue light emitting element LSB is turned on, thereby displaying a blue image on the display area DA. The transparent sub-frame period SFT is a period during which a transparent voltage of the same potential as the voltage applied to the common electrode CE is written to each of the pixels PX arranged in the display area DA to make the liquid crystal layer LC1 (display device 2) transparent. Therefore, no light emitting elements of any color are turned on (i.e., the light emitting elements are in a turn-off state) in the transparent sub-frame period SFT.

In the first frame period FPd1, the sub-frame periods SFR, SFG, SFB, and SFT are aligned in the order of the transparent sub-frame period SFT, the red sub-frame period SFR, the green sub-frame period SFG, and the blue sub-frame period SFB, as shown in FIG. 6.

When the transparent sub-frame period SFT, which is the first sub-frame period included in the first frame period FPd1, starts, the display device 2 writes a transparent voltage to each of the pixels PX arranged in the display area DA according to the control signal from the display control unit 51 in the control device 5 to make the display device 2 transparent. In addition, the shutter 4 makes the shutter 4 open according to the control signal from the shutter control unit 53 in the control device 5. According to this, since the display device 2 is transparent and the shutter 4 is opened, the camera 3 can capture a subject (user U1 shown in FIG. 1) located in front of the display device 2 through the display device 2.

When the transparent sub-frame period SFT included in the first frame period FPd1 ends and the red sub-frame period SFR starts, the display device 2 writes red video data to each of the pixels PX arranged in the display area DA according to the control signal from the display control unit 51 in the control device 5, and urges the red light emitting element LSR to be turned on according to the control signal from the lighting control unit 52 in the control device 5. According to this, a red image is displayed on the display device 2. The shutter 4 causes the shutter 4 to transition from the opened state to the closed state according to the control signal from the shutter control unit 53 in the control device 5. More specifically, for example, the shutter 4 applies a voltage higher than the reference potential to the first electrode 31 shown in FIG. 4, and urges the shutter 4 to transition from the opened state to the closed state. According to this, the shutter 4 can block light traveling toward the camera 3. In this example, since a voltage higher than the reference potential is applied to the first electrode 31 to cause the shutter 4 to transition to the closed state as described above, the polarity of the shutter 4 becomes positive (+ polarity).

When the red sub-frame period SFR included in the first frame period FPd1 ends and the green sub-frame period SFG starts, the display device 2 writes green video data to each of the pixels PX arranged in the display area DA according to the control signal from the display control unit 51 in the control device 5 and urges the green light emitting element LSG to be turned on according to the control signal from the lighting control unit 52 in the control device 5. According to this, a green image is displayed on the display device 2. The shutter 4 maintains the closed state of the shutter 4 according to the control signal from the shutter control unit 53 in the control device 5. According to this, the shutter 4 can block the light traveling toward the camera 3, similarly to the red sub-frame period SFR. In addition, since a voltage higher than the reference potential continues being applied to the first electrode 31 of the shutter 4 to maintain the closed state, the polarity of the shutter 4 shows positive polarity, similarly to the red sub-frame period SFR.

When the green sub-frame period SFG included in the first frame period FPd1 ends and the blue sub-frame period SFB starts, the display device 2 writes blue video data to each of the pixels PX arranged in the display area DA according to the control signal from the display control unit 51 in the control device 5 and urges the blue light emitting element LSB to be turned on according to the control signal from the lighting control unit 52 in the control device 5. According to this, a blue image is displayed on the display device 2. The shutter 4 maintains the closed state of the shutter 4 according to the control signal from the shutter control unit 53 in the control device 5. According to this, the shutter 4 can block the light traveling toward the camera 3, similarly to the red sub-frame period SFR and the green sub-frame period SFG. In addition, since a voltage higher than the reference potential continues being applied to the first electrode 31 of the shutter 4 to maintain the closed state, the polarity of the shutter 4 shows positive polarity, similarly to the red sub-frame period SFR and the green sub-frame period SFG.

When the first frame period FPc1 starts, the camera 3 starts exposing sequentially from the first pixel row to the last pixel row in the image sensor, as described above. Light is made incident on the camera 3 only during the transparent sub-frame period SFT, which is included in the first frame period FPd1 of the display device 2. Therefore, the camera 3 captures an image I1 as an image corresponding to the pixel rows exposed during the above-described transparent sub-frame period SFT (i.e., pixel rows with shaded lines).

The brightness of the image captured by the camera 3 changes according to the amount of light made incident on the pixel rows. Therefore, as shown in FIG. 6, the image I1 captured in the first frame period FPc1 becomes brighter in an upper image area corresponding to the pixel rows whose exposure time is long, and becomes darker toward a middle image area corresponding to the pixel rows whose exposure time is short. Since no light is made incident on the pixel rows corresponding to the lower image area (i.e., pixel rows whose exposure is started after the transparent sub-frame period SFT), nothing is reflected in the lower image area, which is black as shown in FIG. 6.

In the second frame period FPd2, the sub-frame periods SFR, SFG, SFB, and SFT are aligned in the order of the red sub-frame period SFR, the green sub-frame period SFG, the transparent sub-frame period SFT, and the blue sub-frame period SFB, as shown in FIG. 6. Incidentally, since the operation of the display device 2 in each of the sub-frame periods SFR, SFG, SFB, and SFT is the same as that in the first frame period FPd1, its detailed description will be omitted here. Only the operation of the shutter 4 and an image I2 captured by the camera 3 will be described below.

When the green sub-frame period SFG included in the second frame period FPd2 of the display device 2 ends and the transparent sub-frame period SFT starts, the shutter 4 urges the shutter 4 to transition from the closed state to the opened state in accordance with the control signal from the shutter control unit 53 in the control device 5. More specifically, the shutter 4 urges the shutter 4 to transition from the closed state to the opened state by applying a voltage of the same potential as the reference potential to the first electrode 31.

Light is made incident on the camera 3 only during this transparent sub-frame period SFT. Therefore, the camera 3 captures the image I2 as an image corresponding to the pixel rows exposed during the transparent sub-frame SFT included in the second frame period FPd2 (i.e., pixel rows with shaded lines). As shown in FIG. 6, the image I2 captured in the second frame period FPc2 becomes brighter in a lower image area corresponding to the pixel rows whose exposure time is long, and becomes darker toward a middle image area corresponding to the pixel rows whose exposure time is short. Since no light is made incident on the pixel rows corresponding to the upper image area (i.e., pixel rows whose exposure is ended before the transparent sub-frame period SFT), nothing is reflected in the upper image area of the image I2, which is black as shown in FIG. 6.

When the transparent sub-frame period SFT included in the second frame period FPd2 ends and the blue sub-frame period SFB starts, the shutter 4 urges the shutter 4 to transition from the opened state to the closed state according to the control signal from the shutter control unit 53 in the control device 5. More specifically, the shutter 4 urges the shutter 4 to transition from the opened state to the closed state by applying a voltage lower than the reference potential to the first electrode 31. In this example, since a voltage lower than the reference potential is applied to the first electrode 31 to cause the shutter 4 to transition to the closed state as described above, the polarity of the shutter 4 becomes negative (− polarity).

In the third frame period FPd3, the sub-frame periods SFR, SFG, SFB, and SFT are aligned in the order of the red sub-frame period SFR, the green sub-frame period SFG, the blue sub-frame period SFB, and the transparent sub-frame period SFT, as shown in FIG. 6. Incidentally, since the operation of the display device 2 in each of the sub-frame periods SFR, SFG, SFB, and SFT is the same as that in the first frame period FPd1, its detailed description will be omitted here. Only the operation of the shutter 4 and an image I3 captured by the camera 3 will be described below.

When the blue sub-frame period SFB included in the third frame period FPd3 of the display device 2 ends and the transparent sub-frame period SFT starts, the shutter 4 urges the shutter 4 to transition from the closed state to the opened state in accordance with the control signal from the shutter control unit 53 in the control device 5. More specifically, the shutter 4 urges the shutter 4 to transition from the closed state to the opened state by applying a voltage of the same potential as the reference potential to the first electrode 31.

Light is made incident on the camera 3 only during this transparent sub-frame period SFT. Therefore, the camera 3 captures the image I3 as an image corresponding to the pixel rows exposed during the transparent sub-frame SFT included in the third frame period FPd3 (i.e., pixel rows with shaded lines). As shown in FIG. 6, since no light is made incident on the image except for the pixel rows corresponding to the lower image area, during the transparent sub-frame period SFT included in the third frame period FPd3, a subject is reflected only in a lower image area of the image I3 and nothing is reflected in the other area, which becomes black.

In the fourth frame period FPd4, the sub-frame periods SFR, SFG, SFB, and SFT are aligned in the order of the red sub-frame period SFR, the transparent sub-frame period SFT, the green sub-frame period SFG, and the blue sub-frame period SFB, as shown in FIG. 6. Incidentally, since the operation of the display device 2 in each of the sub-frame periods SFR, SFG, SFB, and SFT is the same as that in the first frame period FPd1, its detailed description will be omitted here. Only the operation of the shutter 4 and the image I4 captured by the camera 3 will be described below.

When the red sub-frame period SFR, which is the first sub-frame period included in the fourth frame period FPd4, starts, the shutter 4 urges the shutter 4 to transition from the opened state to the closed state in accordance with the control signal from the shutter control unit 53 in the control device 5. More specifically, the shutter 4 urges the shutter 4 to transition from the opened state to the closed state by applying a voltage higher than the reference potential to the first electrode 31. In this example, since a voltage higher than the reference potential is applied to the first electrode 31 to cause the shutter 4 to transition to the closed state as described above, the polarity of the shutter 4 becomes positive.

When the red sub-frame period SFR included in the fourth frame period FPd4 ends and the transparent sub-frame period SFT starts, the shutter 4 urges the shutter 4 to transition from the closed state to the opened state in accordance with the control signal from the shutter control unit 53 in the control device 5. More specifically, the shutter 4 urges the shutter 4 to transition from the closed state to the opened state by applying a voltage of the same potential as the reference potential to the first electrode 31.

Light is made incident on the camera 3 only during this transparent sub-frame period SFT. Therefore, the camera 3 captures the image I4 as an image corresponding to the pixel rows exposed during the transparent sub-frame SFT included in the fourth frame period FPd4 (i.e., pixel rows with shaded lines). As shown in FIG. 6, the image I4 captured in the fourth frame period FPc4 becomes brighter in a middle image area corresponding to the pixel rows whose exposure time is long, and becomes darker toward an upper image area and a lower image area corresponding to the pixel rows whose exposure time is short.

When the transparent sub-frame period SFT included in the fourth frame period FPd4 ends and the green sub-frame period SFG starts, the shutter 4 urges the shutter 4 to transition from the opened state to the closed state in accordance with the control signal from the shutter control unit 53 in the control device 5. More specifically, the shutter 4 urges the shutter 4 to transition from the opened state to the closed state by applying a voltage lower than the reference potential to the first electrode 31. In this example, since a voltage lower than the reference potential is applied to the first electrode 31 to cause the shutter 4 to transition to the closed state as described above, the polarity of the shutter 4 becomes negative.

According to the above-described operations shown in FIG. 6, in the four transparent sub-frame periods SFT included in the four frame periods FPd1 to FPd4 of the display device 2, each pixel row of the image sensor constituting the camera 3 is exposed for one frame period FPc of the camera 3 (in other words, for a time equivalent to the difference between the exposure start time and the exposure end time). In other words, each pixel row of the image sensor constituting the camera 3 is exposed for the time equal to each other. For this reason, as will be described in detail later, an image IA that can be displayed based on the images I1 to I4 can be set to an image with uniform brightness from the upper image area to the lower image area (in short, an image with uniform brightness over the entire image area) as shown in FIG. 6.

In addition, in the above-described operation shown in FIG. 6, every time the shutter 4 is urged to transition to the closed state, the polarity of the shutter 4 is controlled to be reversed from the polarity at the time of having previously transitioned to the closed state. According to this, as shown in FIG. 6, the time when the shutter 4 shows positive polarity and the time when the shutter 4 shows negative polarity can be made to match in one cycle, and the occurrence of so-called burn-in can be suppressed.

Figure 7:
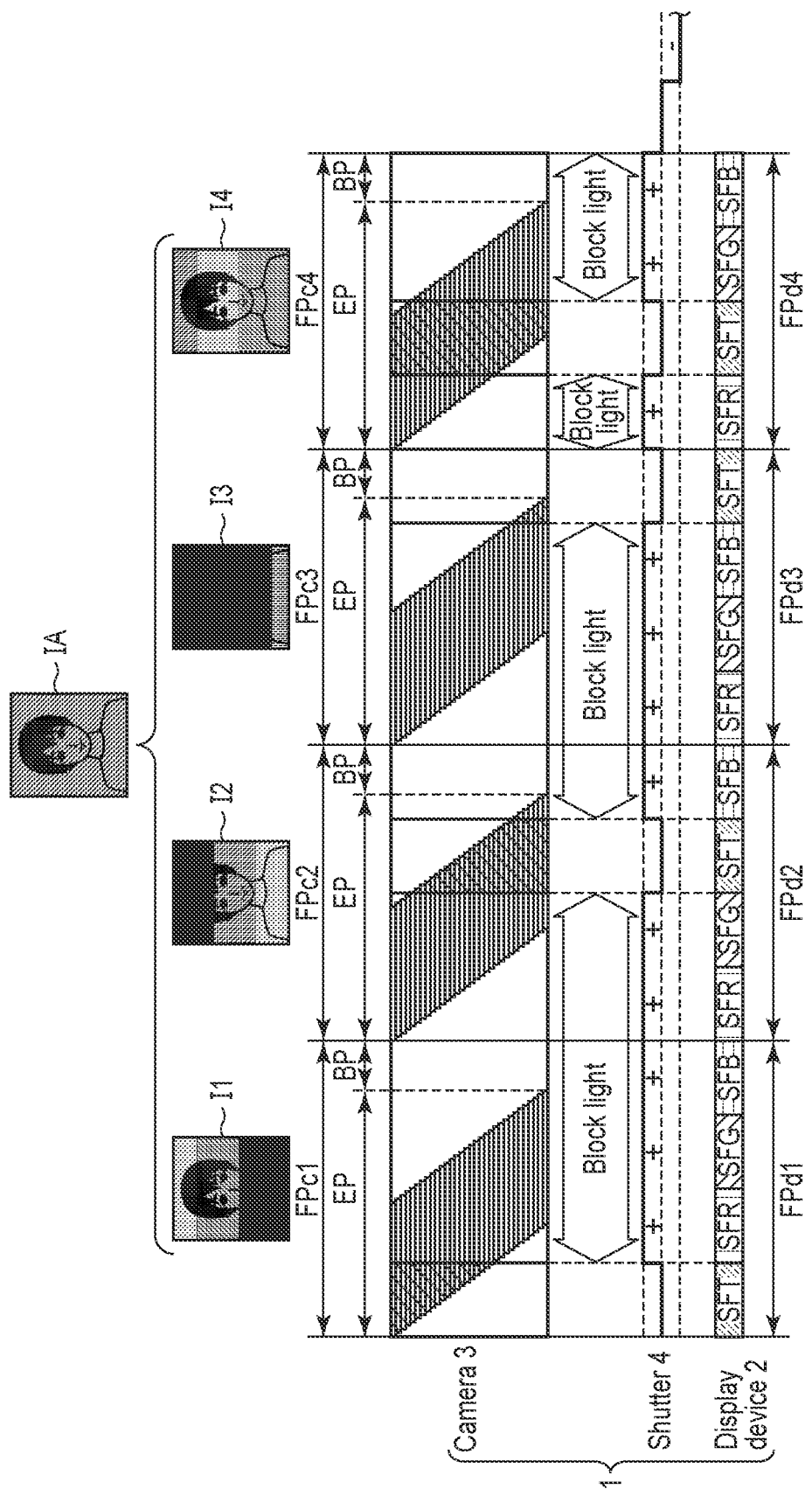
FIG. 7 is a view illustrating an operation example of the display system according to the embodiment.

In FIG. 6, the operation of reversing the polarity of the shutter 4 is executed every time the shutter 4 is urged to transition to the closed state, in order to suppress the occurrence of burn-in, but the occurrence of burn-in may be suppressed by performing the control of reversing the polarity of the shutter in every cycle (more specifically, the operation of making the polarity of the shutter 4 in the closed state entirely positive in the first cycle and making the polarity of the shutter 4 in the closed state entirely negative in the following cycle), as shown in, for example, FIG. 7.

Figure 8:
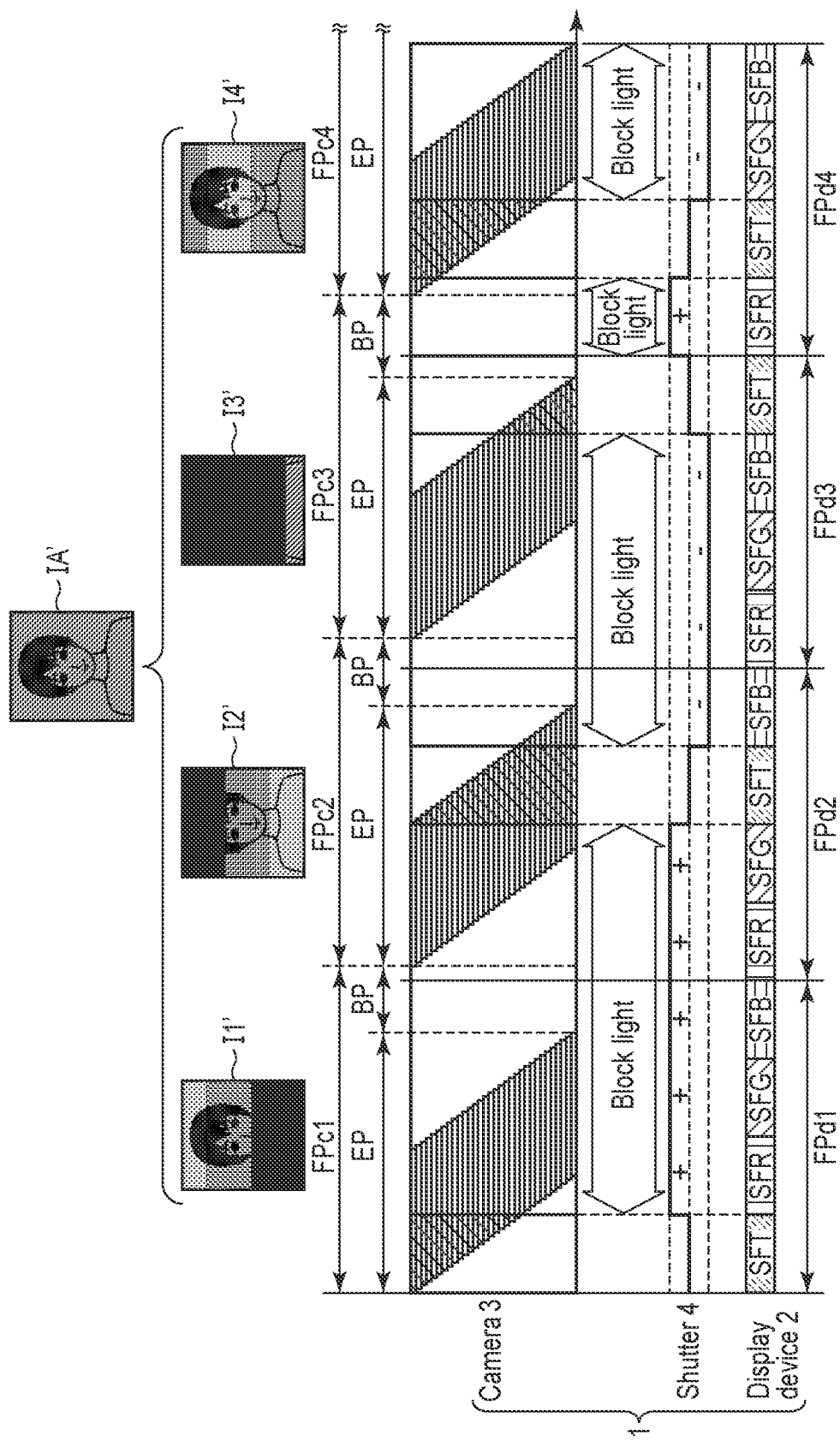
FIG. 8 is a view illustrating an operation example of the display system according to the embodiment.

In addition, the operation in the case where one frame period FPd of the display device 2 matches the one frame period FPc of the camera 3 (i.e., the case where the display device 2 and the camera 3 operate synchronously with each other) has been described with reference to FIG. 6, but the display system 1 of the present embodiment can also operate in a case where the one frame period FPd of the display device 2 does not match the one frame period FPd of the camera 3, for example, the one frame period FPc of the camera 3 is slightly longer than one frame period FPd of the display device 2, as shown in, for example, FIG. 8. In this case, each pixel row of the image sensor constituting the camera 3 cannot be exposed for one frame period FPc of the camera 3, in the transparent sub-frame period SFT included in the four frame periods FPd1 to FPd4 of the display device 2, but the difference in exposure time of each pixel row can be suppressed to the extent that the image quality is not affected if the difference between one frame period FPd of the display device 2 and one frame period FPc of the camera 3 is only a few percent, and an image IA' that can be displayed based on images I1' to I4' can be set to an image with substantially uniform brightness from the upper image area to the lower image area (in short, an image with substantially uniform brightness over the entire image area).

FIG. 9 is a view illustrating an example of a method of displaying the image IA based on the images I1 to I4 captured by the operation shown in FIG. 6 on a display device (not shown) on a communication partner's side.

The images I1 to I4 captured by the operation shown in FIG. 6 are sequentially transmitted to the computer 6' on the communication partner's side by the computer 6, as shown in, for example, FIG. 9(a). The images I1 to I4 received by the computer 6' are sequentially displayed on the display device on the communication partner's side, for example, over a four-frame period. In general, a person cannot visually recognize the images displayed in one frame period as they are, but visually recognizes the images displayed over a plurality of frame periods as one image. Therefore, it is possible to urge the communication partner to visually recognize the image IA obtained by combining the images I1 to I4, by sequentially transmitting the images I1 to I4 to the computer 6' on the communication partner's side and urging the images I1 to I4 to be sequentially displayed on the display device on the communication partner's side. According to this, the communication partner can be provided with an image with uniform brightness (in this case, image IA).

Alternatively, the images I1 to I4 captured by the operation shown in FIG. 6 may be combined by the computer 6 and then transmitted to the computer 6' on the communication partner's side, as shown in FIG. 9(b). According to this, since the image IA obtained by synthesizing the images I1 to I4 can be transmitted to the computer 6' on the communication partner's side, the communication partner can be provided with the image with uniform brightness (in this case, image IA) without using the visual effect.

Advantages of the display device 1 according to the present embodiment will be described below with reference to a comparative example. The comparative example aims to explain parts of the advantages that the display system 1 according to the embodiments can exert, and the configurations and advantages common to the embodiments and the comparative example are not excluded from the scope of the present invention.

Figure 10:
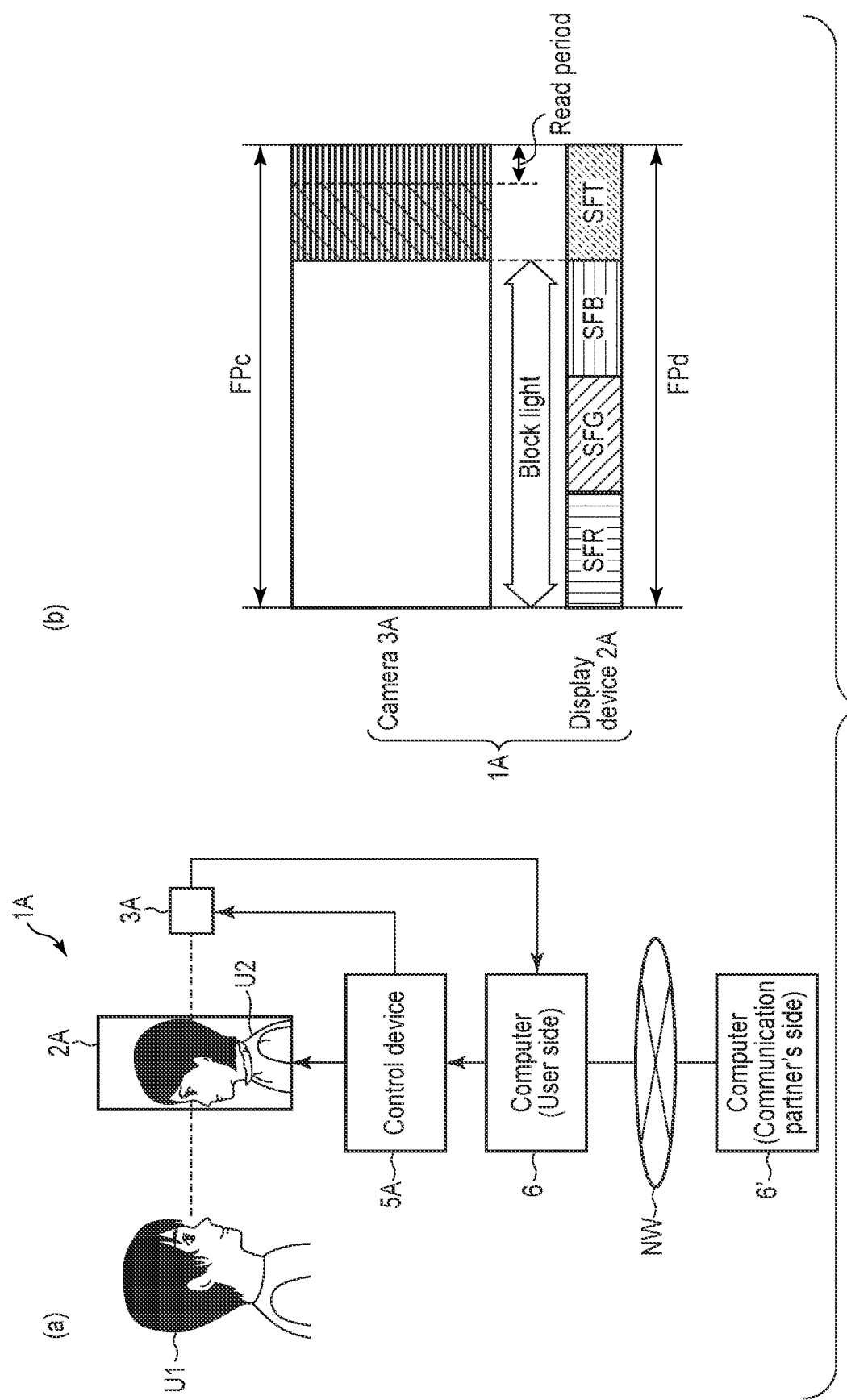

FIG. 10 is a view illustrating a schematic configuration example of the display system according to the first comparative example and the operation of the display system. For convenience of description, "A" is attached to ending of elements according to the first comparative example in the following descriptions. As shown in FIG. 10(a), a display system 1A according to the first comparative example is different from the display system 1 according to the present embodiment in that a camera 3A is a global shutter camera and its operation is controlled by a control device 5A, and that the configuration corresponding to the shutter 4 is omitted.

The global shutter camera 3A does not sequentially expose the pixel rows of the image sensor, unlike the rolling shutter camera (i.e., the camera 3 according to the present embodiment), but can expose all pixel rows of the image sensor at once. For this reason, the control device 5A controls the operation of the camera 3A synchronously with an operation of a display device 2A, and performs control of opening the shutter built in the camera 3A at the timing at which the transparent sub-frame period SFT included in one frame period FPd of the display device 2A is started and the display device 2A becomes in a transparent state, as shown in, for example, FIG. 10(b). Incidentally, since the operation of the display device 2 in each of the sub-frame periods SFR, SFG, SFB, and SFT included in one frame period FPd of the display device 2A is the same as that of the display device 2 according to the present embodiment, its detailed description will be omitted here.

According to the display system 1A of the first comparative example, since the camera 3A equally exposes all the pixel rows of the image sensor in one transparent sub-frame period SFT such that the data of each of the pixels can be read in the following subsequent read period, the camera 3A can capture the image having unique brightness from the upper image area to the lower image area, in the one frame period FPc.

In contrast, there is a problem that the global shutter camera 3A is very expensive and using the camera 3A for the web conference and the video call is not practical. In addition, when the global shutter camera 3A is used, its operation needs to be synchronized with the display device 2A, and a special function to control the operation of the camera 3A synchronously with the display device 2A needs to be implemented in the control device 5A, as described above. As described above, there is a problem that the display system 1A according to the first comparative example requires large costs to realize.

In contrast, the display system 1 according to the present embodiment uses the rolling shutter camera 3A, which is less expensive than the global shutter camera 3A. In addition, since the display system 1 according to the present embodiment does not need to be synchronized with the operations of the display device 2 and the camera 3, the above-described special function does not need to be implemented in the control device 5. Therefore, the display system 1 according to the present embodiment can be realized without requiring a great deal of costs, unlike the display system 1A according to the first comparative example.

Figure 11:
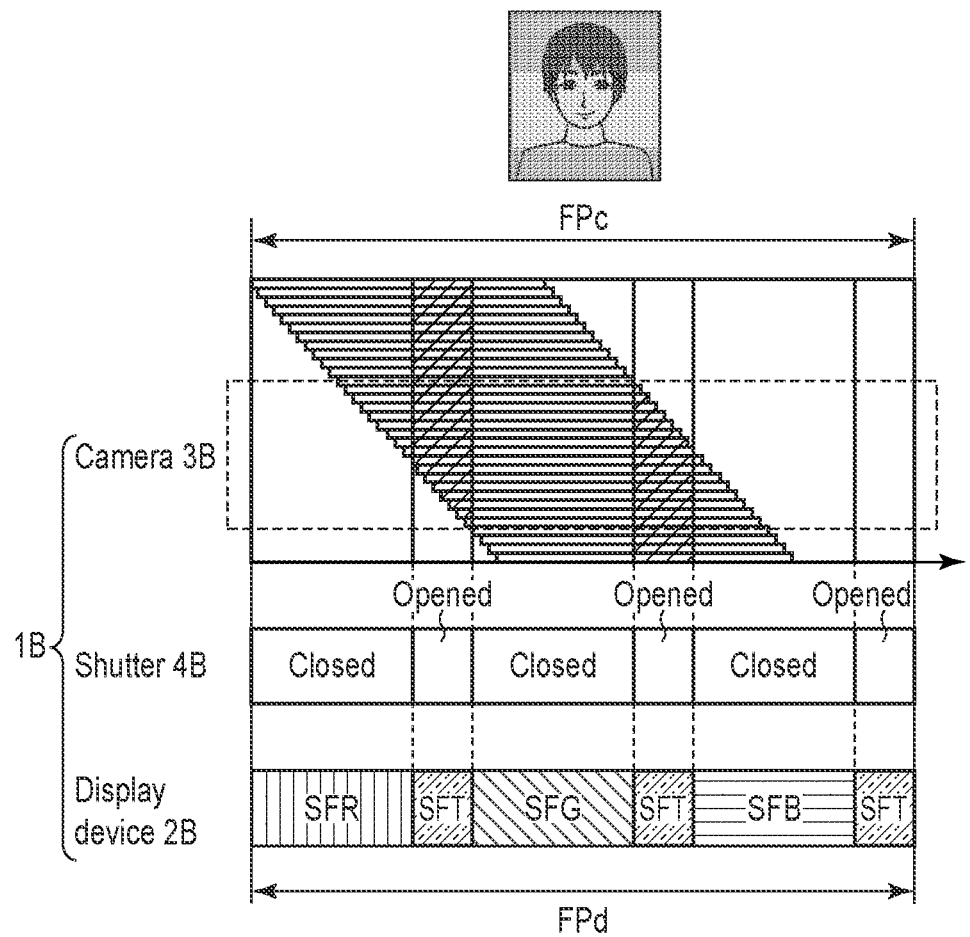

FIG. 11 is a view illustrating an operation example of the display system according to a second comparative example. For convenience of description, "B" is attached to ending of elements according to the second comparative example in the following descriptions. The display system 1B according to the second comparative example has the same configuration as the display system 1 according to the present embodiment. In contrast, as shown in FIG. 11, a display system 1B according to the second comparative example is different from the display system 1 according to the present embodiment in that one frame period FPd of a display device 2B is composed of a red sub-frame period SFR, a green sub-frame period SFG, a blue sub-frame period SFB, and transparent sub-frame periods SFT each inserted between two of the sub-frame periods SFR, SFG, and SFB.

When the red sub-frame period SFR, which is the first sub-frame period included in one frame period FPd of the display device 2B, starts, the display device 2B writes red video data to each pixel arranged in the display area and turns on the red light emitting element. The display device 2B turns on the red light emitting element and then switches the red light emitting element to a turn-off state after a predetermined period of time has elapsed. After that, when the transparent sub-frame period SFT inserted between the red sub-frame period SFR and the green sub-frame period SFG to be described below starts, the display device 2B writes a transparent voltage to each pixel arranged in the display area to make the display device 2B transparent. When the transparent sub-frame period SFT starts, a shutter 4B urges the shutter 4B to transition from the closed state to the opened state according to a control signal from a control device 5B.

When the transparent sub-frame period SFT following the red sub-frame period SFR ends and the green sub-frame period SFG starts, the display device 2B writes green video data to each pixel arranged in the display area and turns on the green light emitting element. The display device 2B turns on the green light emitting element and then switches the green light emitting element to a turn-off state after a predetermined period of time has elapsed. After that, when the transparent sub-frame period SFT inserted between the green sub-frame period SFG and the blue sub-frame period SFB to be described below starts, the display device 2B writes a transparent voltage to each pixel arranged in the display area to make the display device 2B transparent. When the transparent sub-frame period SFT starts, a shutter 4B urges the shutter 4B to transition from the closed state to the opened state according to a control signal from a control device 5B.

When the transparent sub-frame period SFT following the green sub-frame period SFG ends and the blue sub-frame period SFB starts, the display device 2B writes blue video data to each pixel arranged in the display area and turns on the blue light emitting element. The display device 2B turns on the blue light emitting element and then switches the blue light emitting element to a turn-off state after a predetermined period of time has elapsed. After that, when the transparent sub-frame period SFT inserted between the blue sub-frame period SFB and the red sub-frame period SFR included in the subsequent one frame period FPd starts, the display device 2B writes a transparent voltage to each pixel arranged in the display area to make the display device 2B transparent. When the transparent sub-frame period SFT starts, a shutter 4B urges the shutter 4B to transition from the closed state to the opened state according to a control signal from a control device 5B.

When one frame period FPc starts, the camera 3B starts exposing the image sensor sequentially from the first pixel row to the last pixel row, and captures images corresponding to the pixel rows exposed during the transparent sub-frame period SFT inserted between two of the sub-frame periods SFR, SFG and SFB. In other words, as shown in FIG. 11, the camera 3B captures images corresponding to the pixel rows exposed during the transparent sub-frame period SFT inserted between the red sub-frame period SFR and the green sub-frame period SFG (i.e., the pixel rows with shaded lines) and the pixel rows exposed during the transparent sub-frame period SFT inserted between the green sub-frame period SFG and the blue sub-frame period SFB (i.e., the pixel rows with shaded lines).

The pixel rows from the upper stage to the middle stage of the image sensor constituting the camera 3B are exposed during the transparent sub-frame period SFT inserted between the red sub-frame period SFR and the green sub-frame period SFG, and the pixel rows from the middle stage to the lower stage of the image sensor constituting the camera 3B are exposed during the transparent sub-frame period SFT inserted between the green sub-frame period SFG and the blue sub-frame period SFB. According to this, as shown in FIG. 11, the exposure time of the pixel rows at the middle stage (i.e., the pixel rows surrounded by the shaded lines) of the image sensor constituting the camera 3B is longer than the exposure time of the pixel rows at the upper and lower stages, and an image where the middle image area is brighter than the other areas is captured by the camera 3B included in the display system 1B according to the second comparative example. In other words, interference fringes occur in the captured image.

In contrast, since the display system 1 according to the present embodiment can expose each of the pixel rows of the image sensor constituting the camera 3 in the four transparent sub-frame periods SFT included in the four frame periods FPd1 to FPd4 of the display device 2, for one frame period FPc of the camera 3, and make the exposure time of each pixel row equal, the system can suppress the occurrence of the above-described interference fringes and provide an image having uniform brightness from the upper image area to the lower image area (in short, an image having uniform brightness in the entire image area).

Modified examples of the display system 1 according to the present embodiment will be described below.

First Modified Example

FIG. 12 is a view illustrating an operation example of the display system 1 according to a first modified example. The operation of the display system 1 according to the first modified example is different from that of the display system 1 shown in FIG. 6 in that one frame period FPc of the camera 3 corresponds to the exposure period of each pixel row, as shown in FIG. 12. Since the operation of the display device 2 and the operation of the shutter 4 are the same as those shown in FIG. 6, those detailed description will be omitted here. Only the operation of the camera 3 and the images captured by the camera 3 will be described below.

When one frame period FPc starts, the camera 3 starts exposing sequentially from the first pixel row to the last pixel row in the image sensor. The exposure time of each pixel row is equal to one frame period FPc and, for example, when the exposure of a predetermined pixel row for capturing a predetermined image ends and the read period in the pixel row ends, the exposure of the predetermined pixel row for capturing the next image is started immediately.

The camera 3 captures an image I11 as an image corresponding to pixel rows exposed during the transparent sub-frame period SFT included in the first frame period FPd1 of the display device 2 (i.e., pixel rows marked with left-downward lines) and pixel rows exposed during the transparent sub-frame period SFT included in the second frame period FPd2 of the display device 2 (i.e., pixel rows marked with left-downward lines).

In addition, the camera 3 captures an image I12 as an image corresponding to pixel rows exposed during the transparent sub-frame period SFT included in the second frame period FPd2 of the display device 2 (i.e., pixel rows marked with left-downward thick lines) and pixel rows exposed during the transparent sub-frame period SFT included in the third frame period FPd3 of the display device 2 (i.e., pixel rows marked with left-downward thick lines).

Furthermore, the camera 3 captures an image I13 as an image corresponding to pixel rows exposed during the transparent sub-frame period SFT included in the third frame period FPd3 of the display device 2 (i.e., pixel rows marked with right-downward lines) and pixel rows exposed during the transparent sub-frame period SFT included in the fourth frame period FPd4 of the display device 2 (i.e., pixel rows marked with right-downward lines).

In the above-described operation shown in FIG. 12 as well, each of the pixel rows of the image sensor constituting the camera 3 can be exposed for one frame period FPc of the camera 3, in the four transparent sub-frame periods SFT included in the four frame periods FPd1 to FPd4 of the display device 2, and the exposure time of each pixel row can be made equal, similarly to the operation shown in FIG. 6. Therefore, an image IB that can be displayed based on the images I11 to I13 can be formed as an image having uniform brightness from the upper image area to the lower image area (in short, an image having uniform brightness in the entire image area), as shown in FIG. 12, and the same effect as the operation shown in FIG. 6 can be obtained.

Figure 13:
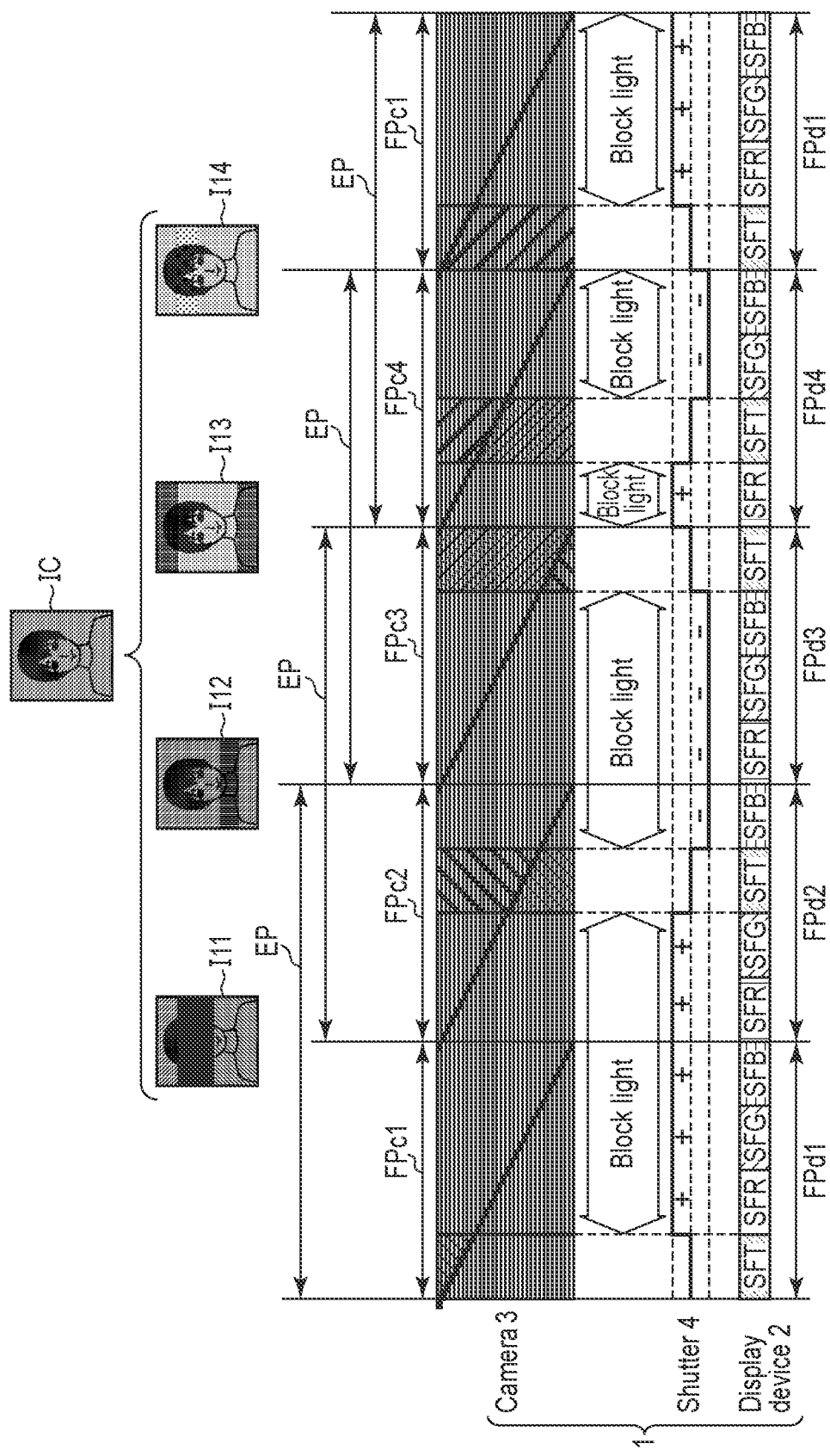

Incidentally, the camera 3 may capture an image I14 as an image corresponding to the pixel rows exposed during the transparent sub-frame period SFT included in the fourth frame period FPd4 of the display device 2 (i.e., pixel rows marked with right-downward thick lines) and pixel rows exposed during the transparent sub-frame period SFT included in the subsequent first frame period FPd1 (i.e., pixel rows marked with right-downward thick lines), as shown in FIG. 13. In this case as well, since the exposure time of each pixel row of the image sensor constituting the camera 3 can be made equal, the image IC that can be displayed based on the images I11 to I14 can be obtained as an image having uniform brightness from the upper image area to the lower image area (in short, an image having uniform brightness over the entire image area), as shown in FIG. 13, and the same effect as that of the operation shown in FIG. 6 can be obtained. Incidentally, the image IC, which can be displayed based on the images I11 to I14, can be made brighter than the image IB, which can be displayed based on the images I11 to I13, since the image IC includes the image I14.

Second Modified Example

Figure 14:
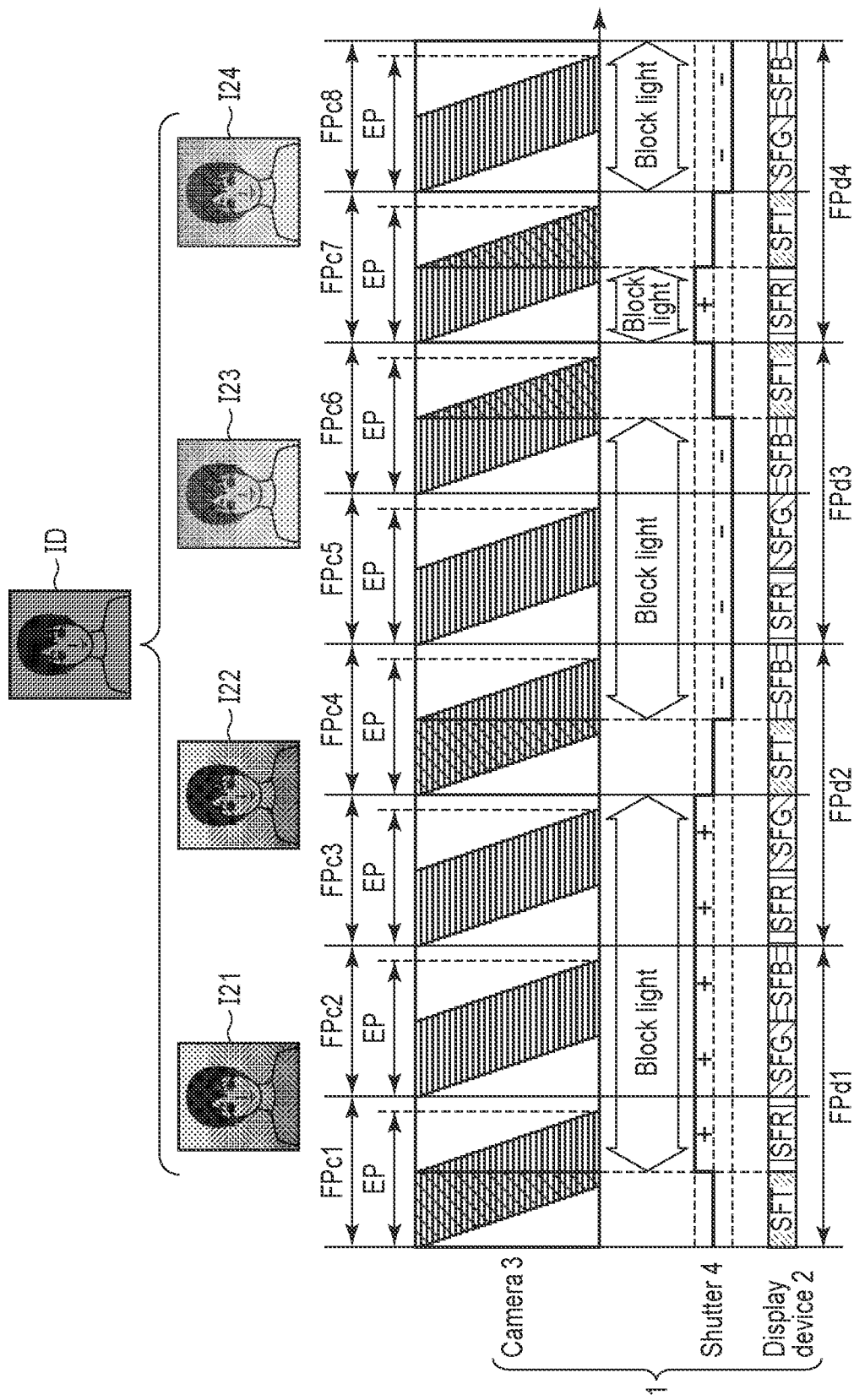
FIG. 14 is a view illustrating an operation example of the display system according to a second modified example of the embodiment.

FIG. 14 is a view illustrating an operation example of the display system 1 according to a second modified example. As shown in FIG. 14, the operation of the display system 1 according to the second modified example is different from the operation of the display system 1 shown in FIG. 6 in that one frame period FPc of the camera 3 is shorter than one frame period FPd of the display device 2 (i.e., one frame period FPc of the camera 3 does not match one frame period FPd of the display device 2) and that four frame periods (i.e., one cycle) of display device 2 match eight frame periods of the camera 3. In other words, the operation of the display system 1 in a case where when the time of the four-frame period included in one cycle of the display device 2 is equal to the time obtained by multiplying one frame period of the camera 3 by N (in this case, N=8) will be described in the second modified example. Since the operation of the display device 2 and the operation of the shutter 4 are the same as those shown in FIG. 6, those detailed description will be omitted here. Only the operation of the camera 3 and the images captured by the camera 3 will be described below.

When the first frame period FPc1 starts, the camera 3 starts sequentially exposing from the first pixel row to the last pixel row in the image sensor, and captures image I21 as an image corresponding to the pixel rows exposed during the transparent sub-frame period SFT (i.e., pixel rows with shaded lines) included in the first frame period FPd1 of the display device 2.

In addition, in the fourth frame period FPc4, the camera 3 captures image I22 as an image corresponding to the pixel rows exposed during the transparent sub-frame period SFT included in the second frame period FPd2 of the display device 2 (i.e., pixel rows with shaded lines).

Furthermore, in the sixth frame period FPc6, the camera 3 captures image I23 as an image corresponding to the pixel rows exposed during the transparent sub-frame period SFT included in the third frame period FPd3 of the display device 2 (i.e., pixel rows with shaded lines).

In addition, in the seventh frame period FPc7, the camera 3 captures image I24 as an image corresponding to the pixel rows exposed during the transparent sub-frame period SFT included in the fourth frame period FPd4 of the display device 2 (i.e., pixel rows with shaded lines).

Incidentally, in the second frame period FPc2, the third frame period FPc3, the fifth frame period FPc5, and the eighth frame period FPc8, the camera 3 also sequentially scans from the first pixel row to the last pixel row in the image sensor but, since the light traveling toward the camera 3 is blocked by the shutter 4 in the closed state, nothing is captured and the image is black. For example, this black image may be discarded.

In the above-described operation shown in FIG. 14 as well, each of the pixel rows of the image sensor constituting the camera 3 can be exposed for two frame periods of the camera 3, in the four transparent sub-frame periods SFT included in the four frame periods FPd1 to FPd4 of the display device 2, and the exposure time of each pixel row can be made equal.

Therefore, the image ID that can be displayed based on the images I21 to I24 can be formed as an image having uniform brightness from the upper image area to the lower image area (in short, an image having uniform brightness in the entire image area), as shown in FIG. 14, and the same effect as the operation shown in FIG. 6 can be obtained.

Third Modified Example

FIG. 15 is a view illustrating an operation example of the display system 1 according to a third modified example. The operation of the display system 1 according to the third modified example is different from that of the display system 1 shown in FIG. 6 in that an operation cycle corresponds to two frame periods of the display device 2 (or two frame periods of the camera 3) as shown in FIG. 15. In addition, the operation of the display system 1 according to the third modified example is different from the operation of the display system 1 shown in FIG. 6 in that the length of the transparent sub-frame period SFT included in one frame period FPd of the display device 2 is half the length of the other sub-frame periods SFR, SFG, and SFB included in one frame period FPd of the display device 2 as shown in FIG. 15. Furthermore, the operation of the display system 1 according to the third modified example is different from the operation of the display system 1 shown in FIG. 6 in that the light emitting element LS is controlled to be in a turn-on state for half of the sub-frame periods SFR, SFG, and SFB included in one frame period FPd of the display device 2 and to be in a turn-off state for the remaining half of the time as shown in FIG. 15. In addition, the operation of the display system 1 according to the third modified example is different from the operation of the display system 1 shown in FIG. 6 in that the shutter 4 is in an opened state during a period of half of each of the sub-frame periods SFR, SFG, and SFB (more specifically, a period during which the light emitting element LS is in the turn-off state) and is in a closed state during a period of the remaining half of each of the sub-frame periods SFR, SFG, and SFB (more specifically, a period during which the light emitting element LS is in the turn-on state) as shown in FIG. 15. In addition, the operation of the display system 1 according to the third modified example is different from the operation of the display system 1 shown in FIG. 6 in that the shutter 4 is controlled to be in the opened state during the transparent sub-frame period SFT included in one frame period FPd and to be in the closed state during the transparent sub-frame period SFT included in the second frame period FPd2 as shown in FIG. 15. For convenience of description, it is assumed that the first frame period FPd1 of the display device 2 matches the first frame period FPc of the camera 3 and that the first frame period FPc of the camera 3 includes only the exposure period EP.

In the first frame period FPd1 of the display device 2, the sub-frame periods SFR, SFG, SFB, and SFT are aligned in the order of the red sub-frame period SFR, the green sub-frame period SFG, the blue sub-frame period SFB, and the transparent sub-frame period SFT, as shown in FIG. 15.

As shown in FIG. 15, when the red sub-frame period SFR, which is the first sub-frame period included in the first frame period FPd1 of the display device 2, starts, the display device 2 writes green video data to each of the pixels PX arranged in the display area DA in accordance with the control signal from the display control unit 51 in the control device 5, during the time SFR1 which is the former half of the red sub-frame period SFR. During the time SFR1 which is the former half of the red sub-frame period SFR, red video data is written to each of the pixels PX, but the light emitting element LS is in the turn-off state, and the display device 2 therefore becomes a state of transmitting light having a certain polarization component. The shutter 4 urges the shutter 4 to be opened according to the control signal from the shutter control unit 53 in the control device 5. According to this, since light having a certain polarization component is emitted from the display device 2 and the shutter 4 is in the opened state, the camera 3 can capture a subject arranged in front of the display device 2 through the display device 2.

The display device 2 turns on the red light emitting element LSR during the time SFR2 which is the latter half of the red sub-frame period SFR included in the first frame period FPd1. According to this, a red image is displayed on the display device 2. The shutter 4 causes the shutter 4 to transition from the opened state to the closed state according to the control signal from the shutter control unit 53 in the control device 5. More specifically, the shutter 4 applies a voltage higher than the reference potential to the first electrode 31 and urges the shutter 4 to transition from the opened state to the closed state. According to this, the shutter 4 can block light traveling toward the camera 3. In this example, since a voltage higher than the reference potential is applied to the first electrode 31 to cause the shutter 4 to transition to the closed state as described above, the polarity of the shutter 4 becomes positive (+ polarity).

When the red sub-frame period SFR included in the first frame period FPd1 ends and the green sub-frame period SFG starts, the display device 2 writes green video data to each of the pixels PX arranged in the display area DA, in accordance with the control signal from the display control unit 51 in the control device 5, during the time SFG1 which is the former half of the green sub-frame period SFG. During the time SFR1 which is the former half of the green sub-frame period SFG, green video data is written to each of the pixels PX, but the light emitting element LS is in the turn-off state, and the display device 2 therefore becomes a state of transmitting light having a certain polarization component, similarly to the time SFR1 which is the former half of the red sub-frame period SFR. The shutter 4 causes the shutter 4 to transition from the closed state to the opened state according to the control signal from the shutter control unit 53 in the control device 5. More specifically, the shutter 4 urges the shutter 4 to transition from the closed state to the opened state by applying a voltage of the same potential as the reference potential to the first electrode 31.

The display device 2 turns on the green light emitting element LSG during the time SFG2 which is the latter half of the green sub-frame period SFG included in the first frame period FPd1. According to this, a green image is displayed on the display device 2. The shutter 4 causes the shutter 4 to transition from the opened state to the closed state according to the control signal from the shutter control unit 53 in the control device 5. More specifically, the shutter 4 applies a voltage lower than the reference potential to the first electrode 31 and urges the shutter 4 to transition from the opened state to the closed state. According to this, the shutter 4 can block light traveling toward the camera 3. In this example, since a voltage lower than the reference potential is applied to the first electrode 31 to cause the shutter 4 to transition to the closed state as described above, the polarity of the shutter 4 becomes negative (− polarity).

When the green sub-frame period SFG included in the first frame period FPd1 ends and the blue sub-frame period SFB starts, the display device 2 writes blue video data to each of the pixels PX arranged in the display area DA, in accordance with the control signal from the display control unit 51 in the control device 5, during the time SFB1 which is the former half of the blue sub-frame period SFB. During the time SFB1 which is the former half of the blue sub-frame period SFB, blue video data is written to each of the pixels PX, but the light emitting element LS is in the turn-off state, and the display device 2 therefore becomes a state of transmitting light having a certain polarization component, similarly to the time SFR1 which is the former half of the red sub-frame period SFR and the time SFG1 which is the former half of the green sub-frame period SFG. The shutter 4 applies a voltage of the same potential as the reference potential to the first electrode 31 in accordance with the control signal from the shutter control unit 53 in the control device 5 and urges the shutter 4 to transition from the closed state to the opened state.

The display device 2 turns on the blue light emitting element LSB during the time SFB2 which is the latter half of the blue sub-frame period SFB included in the first frame period FPd1. According to this, a blue image is displayed on the display device 2. The shutter 4 applies a voltage higher than the reference potential to the first electrode 31 in accordance with the control signal from the shutter control unit 53 in the control device 5 and urges the shutter 4 to transition from the opened state to the closed state. In this example, since a voltage higher than the reference potential is applied to the first electrode 31 to cause the shutter 4 to transition to the closed state as described above, the polarity of the shutter 4 becomes positive.

When the blue sub-frame period SFB included in the first frame period FPd1 ends and the transparent sub-frame period SFT starts, the display device 2 writes a transparent voltage to each of the pixels PX arranged in the display area DA according to the control signal from the display control unit 51 in the control device 5 and becomes transparent. The shutter 4 applies a voltage of the same potential as the reference potential to the first electrode 31 in accordance with the control signal from the shutter control unit 53 in the control device 5 and urges the shutter 4 to transition from the closed state to the opened state.

When the first frame period FPc1 starts, the camera 3 starts exposing sequentially from the first pixel row to the last pixel row in the image sensor. The camera 3 captures an image I41 as an image corresponding to the pixel rows (pixel rows with shaded lines) exposed during the time SFR1 which is the former half of the red sub-frame period SFR, the time SFG1 which is the former half of the green sub-frame period SFG, the time SFB1 which is the former half of the blue sub-frame period SFB, and the transparent sub-frame period SFT.

Next, the second frame period FPd2 of the display device 2 will be described. In the second frame period FPd2 of the display device 2, the sub-frame periods SFR, SFG, SFB, and SFT are aligned in the order of the transparent sub-frame period SFT, the red sub-frame period SFR, the green sub-frame period SFG, and the blue sub-frame period SFB, as shown in FIG. 15. Since the operation of the display device 2 in each of the sub-frame periods SFR, SFG, SFB, and SFT is the same as that in the first frame period FPd1, its detailed description will be omitted here. Only the operation of the shutter 4 and an image captured by the camera 3 will be described below.

As shown in FIG. 15, when the transparent sub-frame period SFT, which is the first sub-frame period included in the second frame period FPd2 of the display device 2, starts, the shutter 4 applies a voltage lower than the reference potential to the first electrode 31 and urges the shutter 4 to transition from the opened state to the closed state in accordance with the control signal from the shutter control unit 53 in the control device 5. In this example, since a voltage lower than the reference potential is applied to the first electrode 31 to cause the shutter 4 to transition to the closed state as described above, the polarity of the shutter 4 becomes negative.

When the transparent sub-frame period SFT included in the second frame period FPd2 ends and the red sub-frame period SFR starts, the shutter 4 applies a voltage of the same potential as the reference potential to the first electrode 31 in accordance with the control signal from the shutter control unit 53 in the control device 5, and urges the shutter 4 to transition from the closed state to the opened state, in the former time SFR1. In contrast, during the latter time SFR2, the shutter 4 applies a voltage higher than the reference potential to the first electrode 31 in accordance with the control signal from the shutter control unit 53 in the control device 5 and urges the shutter 4 to transition from the opened state to the closed state. In this example, since a voltage higher than the reference potential is applied to the first electrode 31 to cause the shutter 4 to transition to the closed state as described above, the polarity of the shutter 4 becomes positive.

When the red sub-frame period SFR included in the second frame period FPd2 ends and the green sub-frame period SFG starts, the shutter 4 applies a voltage of the same potential as the reference potential to the first electrode 31 in accordance with the control signal from the shutter control unit 53 in the control device 5, and urges the shutter 4 to transition from the closed state to the opened state, in the former time SFG1. In contrast, during the latter time SFG2, the shutter 4 applies a voltage lower than the reference potential to the first electrode 31 in accordance with the control signal from the shutter control unit 53 in the control device 5 and urges the shutter 4 to transition from the opened state to the closed state. In this example, since a voltage lower than the reference potential is applied to the first electrode 31 to cause the shutter 4 to transition to the closed state as described above, the polarity of the shutter 4 becomes negative.

When the green sub-frame period SFG included in the second frame period FPd2 ends and the blue sub-frame period SFB starts, the shutter 4 applies a voltage of the same potential as the reference potential to the first electrode 31 in accordance with the control signal from the shutter control unit 53 in the control device 5, and urges the shutter 4 to transition from the closed state to the opened state, in the former time SFB1. In contrast, during the latter time SFB2, the shutter 4 applies a voltage higher than the reference potential to the first electrode 31 in accordance with the control signal from the shutter control unit 53 in the control device 5 and urges the shutter 4 to transition from the opened state to the closed state. In this example, since a voltage higher than the reference potential is applied to the first electrode 31 to cause the shutter 4 to transition to the closed state as described above, the polarity of the shutter 4 becomes positive.

When the second frame period FPc2 starts, the camera 3 starts exposing sequentially from the first pixel row to the last pixel row of the image sensor, and the camera 3 captures an image I42 as an image corresponding to the pixel rows (pixel rows with shaded lines) exposed during the time SFR1 which is the former half of the red sub-frame period SFR, the time SFG1 which is the former half of the green sub-frame period SFG, and the time SFB1 which is the former half of the blue sub-frame period SFB.

According to the above-described operations shown in FIG. 15, the state of transmitting the light having a certain polarization component or the transparent state can be made for the half time of the two frame periods FPd1 and FPd2 of the display device 2, each of the pixel rows of the image sensor constituting the camera 3 can be exposed for one frame period FPc of the camera 3, and the exposure time of each pixel row can be made equal. Therefore, the image IE that can be displayed based on the images I41 and I42 can be formed as an image having uniform brightness from the upper image area to the lower image area (in short, an image having uniform brightness in the entire image area), as shown in FIG. 15, and the same effect as the operation shown in FIG. 6 can be obtained.

In addition, in the above-described operation shown in FIG. 15, every time the shutter 4 is urged to transition to the closed state, the polarity of the shutter 4 is controlled to be reversed from the polarity at the time of having previously transitioned to the closed state. According to this, as shown in FIG. 15, the time when the shutter 4 shows positive polarity and the time when the shutter 4 shows negative polarity can be made to match in two cycles, and the occurrence of so-called burn-in can be suppressed similarly to the operation shown in FIG. 6.

The display system 1 according to one embodiment described above comprises the display device 2 including the display area DA where images are displayed and external light is transmitted and the light emitting element LS, the rolling shutter camera 3 arranged behind the display device 2, the shutter 4 arranged between the display device 2 and the camera 3, and the control device 5 which controls the operations of the display device 2 and the shutter 4. The display device 2 turns on the light emitting element LS, and operates according to one frame period, which includes the red sub-frame period SFR, the green sub-frame period SFG, and the blue sub-frame period SFB for displaying the images in the display area DA, and the transparent sub-frame period SFT for setting the display area DA to be transparent without turning on the light emitting element LS. The control device 5 periodically controls the operations of the display device 2 by considering the plurality of one-frame periods as one cycle, and controls the operations of the display device 2 such that the plurality of one-frame periods included in one cycle start the transparent sub-frame period SFT at different timing from the start of the one-frame period. In addition, the control device 5 controls the operations of the shutter 4 so as to block the light traveling toward the camera 3 during the red sub-frame period, the green sub-frame period, and the blue sub-frame period, and to block the light traveling toward the camera 3 during the transparent sub-frame period SFT.

According to this, since each of the pixel rows of the image sensor constituting the camera 3 can be exposed for an equal time during the plurality of transparent sub-frame periods SFT included in one cycle, occurrence of interference fringes that may occur in the images captured by the rolling shutter camera 3 can be suppressed and images having uniform brightness can be captured (provided).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display system, comprising:
    a display device including a display area where an image is displayed and external light is transmitted, and a light emitting element;
    a rolling shutter camera arranged behind the display device;
    a shutter arranged between the display device and the camera; and
    a control device controlling an operation of the display device and an operation of the shutter, wherein
    the display device operates according to a one-frame period including a first sub-frame period during which the light emitting element is turned on and an image is displayed on the display area, and a second sub-frame period during which the light emitting elements is not turned on and the display area is made transparent, and
    the control device:
        periodically controls the operation of the display device with the plurality of one-frame periods regarded as one cycle, and controls the operation of the display device such that the plurality of one-frame periods included in the cycle start the second sub-frame period at different timing from start of the one-frame periods, and
        controls the operation of the shutter to block light traveling toward the camera during the first sub-frame period and to transmit light traveling toward the camera during the second sub-frame period.

2. The display system of claim 1, wherein
    the camera includes an image sensor including a plurality of pixel rows, and captures a subject in front of the display device by operating each of the pixel rows to be exposed in time division, and
    each of the pixel rows is exposed for an equal time during a plurality of second sub-frame periods included in the cycle.

3. The display system of claim 1, wherein
    the shutter includes a first electrode, a second electrode opposed to the first electrode and having a reference potential, and a liquid crystal layer functioning as a shutter, and
    the shutter transitions to a closed state to block light traveling toward the camera when applying a voltage of a potential different from the reference potential to the first electrode, and transitions to an opened state to transmit light traveling toward the camera when applying a voltage of the same potential as the reference potential to the first electrode.

4. The display system of claim 3, wherein
    a polarity of the shutter indicates a positive polarity when applying a voltage larger than the reference potential to the first electrode and transitioning to the closed state, and indicates a negative polarity when applying a voltage smaller than the reference potential to the first electrode and transitioning to the closed state.

5. The display system of claim 4, wherein
    every time the shutter is urged to transition from the opened state to the closed state, the control device controls an operation of the shutter so as to reverse a polarity of the shutter from a polarity of the time when the shutter is in the closed state, and makes a time when the polarity of the shutter indicates a positive polarity match a time when the polarity of the shutter indicates a negative polarity in the cycle.

6. The display system of claim 4, wherein
    the control device controls an operation of the shutter so as to reverse a polarity of the shutter from a polarity of the previous cycle, in each cycle, and makes a time when the polarity of the shutter indicates a positive polarity match a time when the polarity of the shutter indicates a negative polarity in two sequential cycles.

7. The display system of claim 1, further comprising:
    a computer obtaining an image captured by the camera, wherein
    the computer is communicably connected to the other computer via a network, and sequentially transmits images obtained from the camera to the other computer.

8. The display system of claim 7, wherein
    when receiving the images transmitted from the other computer, the computer outputs the received images to the control device.

9. The display system of claim 1, further comprising:
    a computer obtaining an image captured by the camera, wherein
    the computer is communicably connected to the other computer via a network and, when obtaining images for the cycle from the camera, synchronizes the obtained images for the cycle and transmits the synthesized image to the other computer.

10. The display system of claim 8, wherein
    when receiving the images transmitted from the other computer, the computer outputs the received images to the control device.

11. The display system of claim 1, wherein
    the first sub-frame period includes a red sub-frame period in which a red light emitting element is turned on and a red image is displayed on the display area, a green sub-frame period in which a green light-emitting element is turned on and a green image is displayed on the display area, and a blue sub-frame period in which a blue light-emitting element is turned on and a blue image is displayed in the display area,
    the display device operates according to the one-frame period including the red sub-frame period, the green sub-frame period, the blue sub-frame period, and the second sub-frame period, and the red sub-frame period, the green sub-frame period, the blue sub-frame period, and the second sub-frame period are set to have lengths equal to one another, and
    the control device periodically controls the operation of the display device with four frame periods set as the cycle.

12. A display system, comprising:
    a display device including a display area where an image is displayed and external light is transmitted, and a light emitting element;
    a rolling shutter camera arranged behind the display device;
    a shutter arranged between the display device and the camera; and
    a control device controlling an operation of the display device and an operation of the shutter, wherein
    the display device operates according to a one-frame period including a first sub-frame period during which the light emitting element is turned on and an image is displayed on the display area, and a second sub-frame period during which the light emitting elements is not turned on and the display area is made transparent,
    the first sub-frame period includes a red sub-frame period in which a red light emitting element is turned on and a red image is displayed on the display area, a green sub-frame period in which a green light-emitting element is turned on and a green image is displayed on the display area, and a blue sub-frame period in which a blue light-emitting element is turned on and a blue image is displayed in the display area, the display device operates according to the one-frame period including the red sub-frame period, the green sub-frame period, the blue sub-frame period, and the second sub-frame period, the red sub-frame period, the green sub-frame period, and the blue sub-frame period are set to have lengths equal to one another, and the second sub-frame period is set to have half a length of the red sub-frame period, the green sub-frame period, and the blue sub-frame period, and the control device periodically controls the operation of the display device with two frame periods set as one cycle, and controls the operation of the display device to start each sub-frame period in the order of the first sub-frame period and the second sub-frame period in the first frame period included in the cycle, and controls the operation of the display device to start each sub-frame period in the order of the second sub-frame period and the first sub-frame period in a subsequent frame period included in the cycle, and the control device controls the operation of the shutter so as to transmit light traveling toward the camera in half of the red sub-frame period, the green sub-frame period, and the blue sub-frame period included in the first sub-frame period, and in the second sub-frame period included in the first frame period, and to block light traveling toward the camera in half of the red sub-frame period, the green sub-frame period, and the blue sub-frame period included in the first sub-frame period, and in the second sub-frame period included in the subsequent frame period.

* * * * *